United States Patent [19]

Uchida et al.

[11] Patent Number: 4,963,370
[45] Date of Patent: Oct. 16, 1990

[54] PROCESS FOR PRODUCING PROTEINOUS MATERIAL

[75] Inventors: Yasuzo Uchida, 2-4 4-chome, Kanamachi, Katsushika-ku, Tokyo, 125, Japan; Hitoshi Nagasaki; Goro Yamamoto; Keiji Koyama, all of Tokyo, Japan

[73] Assignees: Asahi Denka Kogyo Kabushiki Kaisha; Yasuzo Uchida, both of Tokyo, Japan

[21] Appl. No.: 350,745

[22] PCT Filed: Feb. 29, 1988

[86] PCT No.: PCT/JP88/00222
§ 371 Date: Apr. 28, 1989
§ 102(e) Date: Apr. 28, 1989

[87] PCT Pub. No.: WO89/02705
PCT Pub. Date: Apr. 6, 1989

[30] Foreign Application Priority Data

Oct. 1, 1987 [JP] Japan .............................. 62-248989
Oct. 1, 1987 [JP] Japan .............................. 62-248990

[51] Int. Cl.⁵ .................. A22C 25/00; A22C 29/00; A23J 1/04; A23L 1/325
[52] U.S. Cl. ............................... 426/7; 426/59; 426/643; 426/646; 426/657
[58] Field of Search .................. 426/56, 55, 59, 63, 426/2, 7, 643, 646, 656, 657

[56] References Cited

U.S. PATENT DOCUMENTS 3,041,174  6/1962  Ehlert .................................. 426/7
3,561,973  2/1971  Rutman ................................ 426/7
4,405,649  9/1983  Jeffreys et al. ..................... 426/59

FOREIGN PATENT DOCUMENTS 3617393  9/1961  Japan .
0376318  6/1962  Japan .
0130374  7/1985  Japan .
0221058  11/1985  Japan .

*Primary Examiner*—Marianne Cintins
*Attorney, Agent, or Firm*—Frishauf, Holtz Goodman & Woodward

[57] ABSTRACT

A process for producing a proteinous material which comprises coarsely grinding fish bodies including bones and/or shells, from which the internals had been removed optionally together with heads and/or skins, defatting said coarsely ground fish bodies if required, and either (1) fermenting said coarsely ground fish bodies with an enzyme and/or a microorganism, inactivating said enzyme and/or microorganism and then finely grinding the fermented material; or (2) finely grinding said coarsely ground fish bodies, fermenting the same with an enzyme and/or a microorganism, and then inactivating said enzyme and/or microorganism; or (3) finely grinding said coarsely ground fish bodies while fermenting the same with an enzyme and/or a microorganism and then inactivating said enzyme and/or microorganism is disclosed.

6 Claims, No Drawings

PROCESS FOR PRODUCING PROTEINOUS MATERIAL

TECHNICAL FIELD

This invention relates to a process for producing a proteinous material from fishes and shellfishes. The proteinous material produced by the process of the present invention contains bones and/or shells and is highly nutritious.

BACKGROUND ART

Fishes and shellfishes have been mainly used in the production of fish cakes which may be prepared, for example, adding starch, common salt, seasonings and water optionally together with other components to ground meat of fish or shellfish, kneading the resulting mixture, forming the same into an arbitrary form and then heating the product to thereby solidify the same by taking advantage of the capability of gelation of proteins contained in the said meat.

These fish cakes are among main processed foods obtained from fishes and shellfishes are an important protein source in Japan. Thus the value of fishes and shellfishes as a protein source may be greatly enhanced by employing them not only in the form of processed foods but also as starting materials for various food products.

When fishes or shellfishes are used as starting materials for various foods, however, the proteins contained therein, having a capability of gelation, would cause gelation in a heat treatment step commonly involved in the preparation of foods, thus forming heterogeneous undissolved lumps. This is seriously disadvantageous since the inherent taste of the food is damaged thereby. Thus it is preferable to eliminate or minimize the capability of gelation of fish proteins in the application of fishes and shellfishes merely as a protein source for various foods, though it is necessary in the production of fish cakes.

Proteinous materials showing no capability of gelation were disclosed in, for example, Japanese Patent Laid-Open No. 63140/1984. However these proteinous materials are one obtained from fish meat and are poor in nutrients such as calcium or iron. In addition, a proteinous material produced from fish bodies from which the internals and/or skins are removed, according to the process as disclosed in the above reference has an unpleasant texture and fish oil produced therefrom would be oxidized. Thus these products are unsuitable as foods.

Accordingly it is an object of the present invention to provide a process for producing a highly nutritious proteinous material available in various foods from fish bodies which still contain bones but from which the internals and/or skins have been removed.

It is another object of the present invention to provide a process for producing a proteinous material having a small capability of gelation and containing large amounts of nutrients such as calcium and iron, which is highly available in various foods unlike conventional fish meal which is available only in feeds, from fishes and shellfishes.

Further it is another object of the present invention to provide a process for preparing an unoxidized fish oil and a proteinous material, which is available in various foods unlike conventional fish meal available only in feeds, from fishes and shellfishes rich in fats.

DISCLOSURE OF THE INVENTION

According to the present invention, the abovementioned objects can be achieved by providing a process for producing a proteinous material which comprises: coarsely grinding fish bodies, from which the internals and optionally skins and/or heads have been removed; and either (1) fermenting the coarsely ground fish bodies with an enzyme and/or a microorganism, inactivating said enzyme and/or microorganism and then finely grinding the fermented material; or (2) finely grinding the coarsely ground fish bodies, fermenting the same with an enzyme and/or a microorganism and then inactivating said enyzme and/or microorganism; or (3) finely grinding the coarsely ground fish bodies while fermenting the same with an enzyme and/or a microorganism and then inactivating said enzyme and/or microorganism.

Further the abovementioned objects can be achieved according to the present invention by providing a process for producing a proteinous material which comprises: coarsely grinding fish bodies, from which the internals and optionally the skins and/or heads have been removed; removing fats from the coarsely ground material; and either (1) fermenting the coarsely ground and defatted material with an enzyme and/or a microorganism, inactivating said enzyme and/or microorganism and then finely grinding the fermented material; or (2) finely grinding the coarsely ground and defatted material, fermenting the same with an enzyme and/or a microorganism and then inactivating said enzyme and/or microorganism; or (3) finely grinding the coarsely ground and defatted material while fermenting the same with an enzyme and/or a microorganism and then inactivating said enzyme and/or microorganism.

Now the process for producing a proteinous material of the present invention will be described in detail.

Any edible fish or shellfish may be used in the present invention without limitation. Examples thereof include cod, saury, saurel, bonito, mackerel, sardine, tuna, swordfish, yellowtail, salmon of grade C or below, such as buna salmon, cuttlefish, octopus, shrimp and shellfishes such as short-necked clam, clam and corbicula. These fishes may be either in the raw, frozen or thawed form. They preferably contain 20% by weight or less, still preferably 5% by weight or less, of fats. It is preferable that fishes rich in fats, such as sardine, are defatted, as will be described hereinbelow, to thereby lower the fat content thereof.

In the present invention, fish bodies are fermented with an enzyme and/or a microorganism by exposing the fish bodies to an enzyme and/or a microorganism capable of decomposing proteins.

Examples of the enzyme capable of decomposing proteins to be used in the present invention include proteinases such as acrosin, urokinase, uropepsin, elastase, enteropeptidase, cathepsin, kallikrein, kininase 2, chymotrypsin, chymopapain, collagenase, streptokinase, subtilisin, thermolysin, trypsin, thrombin, papain, pancreatopeptidase, ficin, plasmin, renin, reptilase and rennin; peptidases such as aminopeptidases including arginine aminopeptidase, oxycinase and leucine aminopeptidase, angiotensinase, angiotensin converting enzyme, insulinase, carboxypeptidases including arginine carboxypeptidase, kininase 1 and thyroid peptidase, dipeptidases such as carnosinase and prolinase and pronase; and other proteases which are optionally denatured as well as compositions thereof.

Examples of the microorganism capable of decomposing proteins to be used in the present invention include molds belonging to the genera *Ascergillus, Mucor, Rhizopus, Penicillium* and *Monascus;* lactic acid bacteria belonging to the genera *Streptococcus, Pediococcus, Leuconostoc* and *Lactobacillus,* bacteria such as *Bacillus natto* and *Bacillus subtilis;* and yeasts such as *Saccharomyces ellicsuideus, Saccharomyces cerevisiae* and *Torula* as well as variants and compositions thereof.

An example of the preferable embodiment of the process of the present invention will now be given.

From fish bodies, the internals and optionally the heads and/or skins are removed.

The fish bodies are coarsely ground with, for example, a chopper.

In the case of a fat-rich fish such as sardine, the coarsely ground fish bodies are defatted in, for example, the following manner.

First, it is preferable to heat the fish bodies usually to 70 to 100° C, preferably to 95 to 100° C, usually for 20 to 60 minutes, preferably for 30 to 40 minutes. Although the heating process is not particularly restricted, it is preferable to employ vapor or boiling water therefor.

Then the fat-rich fish bodies are coarsely ground with, for example, a chopper and fats are removed therefrom. The defatting may be carried out by, for example, adding warm water ranging from room temperature to 100° C, preferably from room temperature to 75° C, to the coarsely ground fish bodies in an amount one to five times, preferably once or twice, as much as the fish bodies and pouring the resulting mixture into a dacanter, while maintaining the above water temperature, at a feed rate of 0.5 to 5 t/hr, preferably 1 to 2 t/hr, to thereby defat the fish bodies. This procedure may be repeated several times, preferably once or twice, if required.

The defatting may be continued until the fat content of the coarsely ground fish bodies is lowered to 20% by weight or less, preferably 5% by weight or less and still preferably 3% by weight or less.

It is preferable to add an antioxidant such as vitamin E, vitamin C or lecithin to the coarsely ground and optionally defatted fish bodies.

The coarsely ground and optionally defatted fish bodies are then treated by either (1) fermenting the same with an enzyme and/or a microorganism, inactivating said enzyme and/or microorganism and then finely grinding the fermented material; or (2) finely grinding the same, fermenting the same with an enzyme and/or a microorganism and then inactivating said enzyme and/or microorganism; or (3) finely grinding the same while fermenting the same with an enzyme and/or a microorganism and then inactivating said enzyme and/or microorganism.

As soon as the enzyme and/or microorganism are mixed with the coarsely ground fish bodies, they begin to interact with proteins contained therein, so that the mixture of the enzyme and/or microorganism with the coarsely ground fish bodies should be maintained at an appropriate temperature for an appropriate period of time. Such a temperature and period may be appropriately determined depending on the employed enzyme and/or microorganism and the taste and the extent of gelation of the aimed proteinous material. Generally speaking, the mixture may be maintained at 5 to 70° C, preferably 30 to 50° C, for 10 minutes to 6 hours, preferably for 30 to 60 minutes. The temperature of the mixture may be kept on a constant level throughout the period. Alternately, it may be controlled in two or more steps by, for example, first adjusting the temperature to a definite level and then to another one.

When the maintenance temperature is to be controlled in two or more steps, it may be roughly divided into, for example, a low temperature range of 5 to 15° C, a moderate temperature range of 15 to 35° C. and a high temperature range of 35 to 70° C. When an enzyme is used, the mixture may be maintained in the medium or high temperature range during the first step and then in the low temperature range in the second step. When an enzyme is used together with a microorganism, the mixture may be treated in the high, moderate or low temperature range by the enzyme alone in the first step. Then the mixture is cooled, if required, and the microorganism is added thereto. After homogeneously mixing, the resulting mixture may be maintained in the moderate or low temperature range. When a microorganism is to be used alone, it is preferable to maintain the mixture in the low or moderate temperature range.

After the enzyme and/or microorganism are added to the coarsely or finely ground fish bodies, the mixture is finely divided by applying a mechanical force thereto or by stirring to thereby give a homogeneous mixture. The mixture may be maintained at the temperature as defined above for the above-mentioned period of time while applying a mechanical force thereto. Alternately, the application of the mechanical force may be ceased when a homogeneous mixture is obtained and then the mixture is aged. In this case, the mixture may be maintained at the abovementioned temperature for the abovementioned period of time during the application of the mechanical force as well as the subsequent aging.

In the present invention, the mixture may be finely ground by using a grinder such as a stone mill in such a manner as to give a particle size of a proteinous material, in particular bones and shells, of 200 $\mu$ or less, preferably 100 $\mu$ or less.

The relationship of the extent of grinding and texture was evaluated by ten panelists. As a result, all panelists evaluated a proteinous material of a particle size of 300 $\mu$ or above as coarse and that of a particle size of 200 to 300 $\mu$ as somewhat coarse. Two panelists among ten evaluated that of a particle size of 150 to 200 $\mu$ as coarse, while none evaluated that of a particle size of 100 $\mu$ or less as coarse.

The proteinous material of the present invention may further comprise other components such as other animal protein sources, vegetable protein sources, animal and vegetable fat sources, carbohydrate sources, inorganic salts, e.g., common salt, recondary sodium phosphate or sodium polyphosphate, perfumes, seasonings, taste improvers, antibacterial agents, water, enzymes and/or microorganisms acting on fats and carbohydrates, emulsifiers, colorants, vitamins, preservatives, sweeteners, amino acids, highly unsaturated fatty acids, vegetable extracts and flavorings, without departing from the scope of the invention. These additives may be added in any step during the process of the present invention. Namely, they may be added to the fish bodies at the starting point and then subjected to coarse grinding, fermentation and fine grinding. Alternately, they may be added either in the fermentation step or after the completion of the treatment. Although these additives (subsidiary components) may be added to the proteinous material which has been treated with the enzyme and/or microorganism, it is significantly preferable to homogeneously disperse the same before, or at least during the treatment with the enzyme and/or microorganism in the system in order to obtain a homogeneous product. Thus a highly stable system wherein said additives are homogeneously dissolved, emulsified and/or dispersed can be obtained. However it is preferable to add an edible animal or vegetable fat after the completion of the treatment of the enzyme and/or microorganism, since it may sometimes lower the activities of the enzyme and/or micro-organism.

Examples of said vegetable protein sources to be used as the additives include vegetable proteinous materials obtained from, for example, soybean, peanut, cottonseed, sesami, sunflower and wheat, defatted products thereof, concentrated products thereof and proteins isolated therefrom.

Examples of said animal protein sources to be used as the additives include milk and milk products such as animal milk, defatted milk, condensed milk, whole-fat milk powder, defatted milk powder, reconstituted milk powder, butter, cream and cheese; meat such as beef, horseflesh, pork, and mutton, fowls of poultry such as chicken, duck, goose, turkey and others; processed meat such as dry meat and smoked meat; egg and egg products such as egg, dry egg, frozen egg, yolk and albumen; fish meat and processed fish meat such as minced fish meat and ground fish meat; and other animal proteinous sources such as liver.

Examples of said animal and vegetable fat sources to be used as additives include animal fats such as lard, beef tallow, mutton tallow, horse tallow, fish oil, whale oil and milk fat; vegetable fats such as soybean oil, linseed oil, safflower oil, sunflower oil, cottonseed oil, kapok oil, olive oil, wheat germ oil, corn oil, palm oil, palm kernel oil, sal fat, illipe fat, Borneo taro oil and coconut oil; processed fats obtained by hydrogenating, transesterifying or fractionating the same; and processed fat products such as butter, cream, margarine and shortening.

Examples of said carbohydrate sources to be used as additives include farm products rich in carbohydrates, such as rice, wheat, corn, potato and sweet potato; powders obtained by processing the same, such as rice starch, wheat starch, corn starch and potato starch; processed/denatured starch such as gelatinized starch and dextrin; sugars such as sucrose, honey and starch sugar; fruits such as apple, orange, strawberry and grape; and fruit juices.

Examples of said vitamins to be used as additives include vitamin A, vitamin $B_1$, vitamin $B_2$, vitamin $B_{12}$, vitamin C, vitamin D, pantothenic acid, vitamin E, vitamin H, vitamin K, vitamin L, vitamin M, nicotinic acid, vitamin P, thioctic acid, tioctamide, vitamin R, vitamin S, vitamin T, vitamin U, vitamin V, vitamin W, vitamin X, vitamin Y, lutein and orotic acid. Examples of said amino acids to be used as additives include L-glutamic acid (salt), L-glutamine, glutathione, glycylglycine, D,L-alanine, L-alanine, γ-aminobutyric acid, γ-aminocaproic acid, L-arginine (hydrochloride), L-aspartic acid (salt), L-aspargine, L-citrulline, L-tryptophan, L-threonine, glycine, L-cysteine (derivative), L-histidine (salt), L-hydroxyproline, L-isoleucine, L-leucine, L-lysine (salt), D,L-methionine, L-methionine, L-ornithine (salt), L-phenylalanine, D-phenylglycine, L-proline, L-serine, L-tyrosine and L-valine. Examples of said highly unsaturated fatty acids include linoleic acid, linolenic acid, eicosapentaenoic acid, docosahexaenoic acid and glycerides thereof. Examples of said vegetable extracts include those obtained from various herbs, asparagus and ginseng.

It is generally preferable that a proteinous material produced by the process of the present invention is treated with an enzyme and/or a micro-organism in such a manner as to give a content of water soluble proteins (i.e., a protein fraction which is not precipitated by adding a solution of sodium tirchloroacetate) of 5 to 50% by weight, still preferably 30 to 45% by weight, based on the total proteins. When animal protein source(s) and/or vegetable protein source(s) are employed together with the proteinous material, it is preferable to control the water-soluble protein content thereof to 5 to 40% by weight, still preferably to 20 to 35% by weight. When the water-soluble protein content is less than 5% by weight, the residual muscular fibers of the raw fish meat makes the texture and feel of the proteinous material insufficiently smooth. When it exceeds 50% by weight (or 40% by weight in the case where animal and/or vegetable protein source(s) are employed together), the proteinous material shows an unpreferable bitterness. It is particularly desirable that a proteinous material produced by the process of the present invention comprises 40 to 90% by weight of peptides of 40,000 to 70,000 in molecular weight based on the total peptides except water-soluble peptides and amino acids.

When allowed to stand as such, the proteinous material thus obtained would suffer from deterioration in the physical properties and taste caused by the decomposition of proteins. Thus it is preferable to immediately use the proteinous material in the preparation of solid, flowable or liquid food products to thereby inactivate the enzyme and/or microorganism contained therein in the heating step involved in the preparation process of the above food products. Alternately when the proteinous material is not immediately used in the preparation of solid, flowable or liquid foods, it is preferable to inactivate the enzyme and/or microorganism contained therein by heating; to freeze or spray-dry the proteinous material without inactivating the enzyme and/or microorganism; or to add a substance capable of inactivating the enzyme and/or microorganism thereto before storing (freezing) the same. When fine grinding is to be carried out after the completion of the fermentation, the enzyme and/or microorganism is inactivated by heating or adding a substance capable of inactivating said enzyme and/or microorganism to the proteinous material before finely grinding the fermented material.

The proteinous material produced by the process of the present invention may be stored after pasteurizing, packing and freezing or after drying and powdering.

The proteinous material produced by the process of the present invention, which is rich in proteins originating from the whole fish bodies or some parts thereof, is highly useful since it may be used not only in, for example, oden (Japanese hotchpotch), gruel, noodles, terrine, mousse, meat dumpling, filling of harumaki (Chinese fried food), coating of gyoza (Chinese fried dumpling), filling of won ton, filling of shao-mai, baby food, custard pudding-like food, tofu (soybean curd)-like food, yogurt-like food, filling or thickening of hamburger steak, powdery food, proteinous drink, soup, spread, flowable food for the aged or sick, sauce, chawan-mushi (Japanese pot-steamed hotchpotch)-like food, cheese-like food, soba (buckwheat noodles)-like food, mayonnaise-like food, terrine-like food, fry-like food and coating-like food sometimes as such, but also as a material for preparing these products.

The proteinous material produced by the process of the present invention may be blended with, for example, animal proteins, vegetable proteins, animal and vegetable fats and carbohydrates and used as a food as such or as a food material.

Particular examples of the production of various foods by using a proteinous material produced by the process of the present invention are as follows.

(1) A process for producing a solid or spreadable food such as a processed cheese-like food, cheese spread-like food or liver spread-like food, which comprises blending a proteinous material produced by the process of the present invention with, for example, a vegetable or animal fat source such as a vegetable oil or butter, and a melting promoter such as secondary sodium phosphate, sodium polyphosphate, sodium pyrophosphate or other phosphates optionally together with an animal or vegetable protein source such as cheese or sodium caseinate, seasonings, food preservatives, carbohydrates, pieces of, for example, shrimp, crab, beef, pork, chicken, liver or short-necked clam, flavorings and extracts; homogenizing the obtained mixture by melting the same at 50 to 100° C. under stirring; and then cooling the same.

(2) A process for producing an elastic gel food such as a custard pudding-like food or a jelly-like food, which comprises adding water to a proteinous material produced by the process of the present invention; optionally grinding the mixture to give a slurry; further adding, if required, some additives such as a gelforming agent such as agar, furcellaran, carrageenan, pectin, gelatin, yolk, whole egg or albumen a syneresis inhibitor such as starch, sweeteners, seasonings, perfumes or colorants thereto; homogenizing the resulting mixture; heating the same; and cooling the same.

(3) A process for producing a flowable or liquid food such as a yogurt-like food or a fermented drink, which comprises adding water to a proteinous material produced by the process of the present invention; optionally adding a fermentation aid such as carrageenan, agar, defatted milk or other dairy products, glucose or lactose thereto; grinding the resulting mixture to thereby give a slurry of a protein content of 2 to 10% by weight; pasteurizing said slurry by heating; adding lactic acid bacteria thereto to thereby ferment the same; and adding, if required, some additives such as sweeteners, perfumes, seasonings or colorants thereto in any step of the above process.

(4) A process for producing a drink, which comprises mixing a proteinous material produced by the process of the present invention with an aqueous medium such as water, soymilk, milk, fruit juice, vegetable juice or an aqueous solution containing other ingredients while grinding, if required, thus dissolving water-soluble nitrogen-containing components of said proteinous material in said medium and simultaneously dispersing water-insoluble nitrogen-containing components thereof in said medium; and pasteurizing the resulting mixture; or adding said aqueous medium during the process for the production of a proteinous material of the present invention; controlling the resulting mixture to have an appropriate concentration; and then treating the same with an enzyme and/or a microorganism.

(5) A process for producing a processed wheat flour food such as biscuit, cookie, wafer, cracker, pretzel, cake, pie, coating of cream puff, doughnut, hot cake, bread, pizza pie, okonomiyaki (Japanese pancake), takoyaki (Japanese octopus dumpling), coating of nikuman (meat-filled bun), coating of anman (bean jam-filled bun), coating of shao-mai, coating of harumaki or coating of gyoza, which comprises blending 0.1 to 15 parts by weight, on a solid basis, of a proteinous material produced by the process of the present invention with 100 parts by weight of wheat flour; further adding appropriate components, depending on the aimed processed food, thereto to give a dough; forming said dough; and heating the same by, for example, baking, boiling or frying.

(6) A process for producing a processed soybean protein food such as tofu, aburaage (fried thin bean curd), ganmodoki (fried bean curd dumpling), namaage (fried thick bean curd), yuba (dried bean curd), fibrous soybean protein food, soybean protein curd, organized soybean protein food or soybean protein gel food, which comprises blending 0.1 to 4 parts by weight, on a solid basis, of a proteinous material produced by the process of the present invention with 100 parts by weight of soybean protein; further adding appropriate additives such as seasonings, spices, colorants, the abovementioned animal or vegetable fat sources, animal protein sources, vegetable protein sources, carbohydrate sources, luxuries, vegetables, meat or fish thereto, if required; and then solidifying the soybean protein in the resulting mixture.

(7) A process for producing an emulsified fat composition available as, for example, in the preparation and/or surface-treatment (spreading) of a dough for noodles, bread, rice cake, pie, biscuit, cracker, coating of gyoza, cakes and coating of cream puff or topping or filling for various foods, which comprises adding 0.1 to 15% (by weight; the same will apply hereinafter), on a solid basis, of a proteinous material produced by the process of the present invention to an aqueous medium such as an aqueous solution containing other components; optionally grinding the resulting mixture; and adding 10 to 90% by weight of a vegetable fat thereto optionally together with an emulsifier or an emulsion stabilizer, in order to give a more stably emulsified matter, to thereby form an oil-in-water type emulsion.

(8) A process for producing mochi (rice cake) or rice crackers, which comprises using 0.1 to 10 parts by weight, preferably 0.1 to 5 parts by weight, on a solid basis, of a proteinous material produced by the process of the present invention, which has been preliminarily heated and/or ground, per 100 parts by weight of glutinous or nonglutinous rice or flour thereof; and blending these materials in the step of steaming said rice or rice flour, when mochi is to be produced; or separately heating said proteinous material; and blending the same with said rice or rice flour in the step of pounding the latter, followed by roasting or frying of the obtained mochi dough, if required. In this process, the enzyme and/or microorganism may be inactivated during the production process of said proteinous material or in the heating step of the production of the rice crackers.

(9) A process for producing so-called noodles such as udon, soba and Chinese noodles as well as wheat-foods to be taken after boiling, i.e., noodles in a broad meaning, such as nouille, gnocchis, spaghetti or macaroni, which comprises using 0.1 to 10 parts by weight, preferably 0.1 to 5 parts by weight, on a solid basis, of a proteinous material produced by the process of the present invention with 100 parts by weight of wheat flour; further using, for example, water, egg or milk if required;

and adding said proteinous material to the wheat flour in an appropriate step depending on the aimed noodles, for example, blending said proteinous material to the above materials except for the wheat flour, such as water, before kneading all materials together; kneading the wheat flour, the other materials and a proteinous material together; or kneading the wheat flour and the other materials together and then adding said proteinous material thereto. The enzyme and/or microorganism may be inactivated either during the production process of said proteinous material or in the final thermal pasteurizing step of the production of the noodles.

(10) A process for producing a batter for the coating of a fried food, which is optionally crumbed, such as fried fish, meat, poultry meat, seaweeds, vegetables or mushrooms, which comprises blending 0.1 to 20 parts by weight, preferably 0.1 to 10 parts by weight, on a solid basis, of a proteinous material produced by the process of the present invention with 100 parts by weight of wheat flour optionally together with other components. The expression "fried food" includes not only those to be taken immediately after frying but also so-called chilled foods to be taken after storing at a low temperature as well as pre-cooked frozen foods to be taken after storing in a frozen state.

(11) A process for producing various seasonings in the form of paste, solid, powder, liquid or flowable, such as sauce, soy sauce, miso (bean paste), instant curry, dripping or ketchup, which comprises using a proteinous material produced by the process of the present invention in any step of the preparation of the aimed seasoning.

(12) A process for producing a cooking material, which comprises blending 40 to 80 parts by weight, on a solid basis, of a proteinous material produced by the process of the present invention with 100 parts by weight of wheat flour optionally together with other components. Although the food material thus obtained may be in various forms such as a powder or a dough, it is required to finally formulate the food material into a dough of a total moisture content of 200 to 500 parts by weight per 100 parts by weight of wheat flour in the cooking process. This dough may be formed into various shapes as such, laminated onto other food materials, filled into other food materials or wrapped with other food materials. Then the obtained product may be heated by, for example, baking, boiling, steaming or frying. Thus a cooked food excellent in the feel, flavor and texture can be obtained.

(13) A process for producing an emulsified food mainly similar to mayonnaise and sometimes to dressing, which comprises an oil-in-water type emulsion containing 0.1 to 15% (by weight; the same will apply hereinafter), on a solid basis, of a proteinous material produced by the process of the present invention, 45 to 90% of an edible vegetable oil, vinegar and water. It is possible in some cases that these materials are blended in such a manner as to give the composition as defined above in the production of a proteinous material of the present invention and then the obtained mixture is treated with an enzyme and/or a microorganism.

(14) A process for producing an acidic emulsified food mainly similar to a dressing such as salad dressing and sometimes to mayonnaise, which comprises an oil-in-water type emulsion containing 0.1 to 5% (by weight; the same will apply hereinafter), on a solid basis, of a proteinous material of the present invention, 10 to 45% of an edible vegetable oil, vinegar and water. It is possible in some cases that these materials are blended in such a manner as to give the composition as defined above in the production of a proteinous material of the present invention and then the obtained mixture is treated with an enzyme and/or a microorganism.

(15) A process for producing a processed egg product such as fried egg, egg cake, chawanmushi, egg roll, omelet, tamago-dofu, custard pudding, pudding, custard or Bavarian, which comprises blending 0.1 to 40 parts by weight, on a solid basis, of a proteinous material produced by the process of the present invention with 100 parts by weight of eggs and/or albumen; further adding other additives or food materials, if required, thereto; and solidifying the resulting mixture by heating.

(16) A process for producing a cooked food such as terrine, moose or quenelle, which comprises blending 0.1 to 40% (by weight; the same will apply hereinafter) of a proteinous material produced by the process of the present invention with 5 to 30% of fresh and/or artificial cream, 5 to 30% of ground fish meat and common salt; optionally adding various additives such as vegetables, small fish blocks or seasonings thereto: and solidifying the resulting mixture by heating.

More particularly, a terrine may be prepared by grinding ground fish meat while adding common salt thereto and adding fresh or artificial cream, milk, whole egg and a proteinous material produced by the process of the present invention thereto to thereby give a farce (the first step). Then the farce is optionally mixed with small fish blocks, seasonings and other additives and the resulting mixture is placed in a mold and steamed as such in an oven at 150 to 200° C. for 15 to 30 minutes (the second step). After cooling, the aimed terrine is obtained.

A mousse may be prepared by grinding ground fish meat while adding common salt thereto and optionally adding vegetables, small fish blocks, seasonings and other additives thereto. Then fresh or artificial cream and a proteinous material produced by the process of the present invention are further added thereto and the mixture is kneaded until it becomes homogeneous. The homogeneous mixture is placed in a mold and steamed as such in an oven at 150 to 200° C. for 15 to 30 minutes. Thus the aimed mousse is obtained.

A quenelle may be prepared by preliminarily preparing a panade from milk, butter, wheat flour and whole eggs; grinding ground fish meat while adding common salt thereto; adding a proteinous material produced by the process of the present invention to the ground fish meat; further adding vegetables, small fish blocks, seasonings and other additives thereto; and then adding said panade and fresh or artificial cream thereto. Then the resulting mixture is kneaded until it becomes homogeneous. The homogeneous mixture is formed and heated in boiling water to thereby give the aimed quenelle.

(17) A process for producing flowable foods ranging from a relatively less viscous and semiflowable one such as various potage soups, paste-soup, Chinese corn soup, baby foods and foods for the sick or aged, which comprises using a proteinous material produced by the process of the present invention in any step of the preparation of the aimed flowable food.

(18) A process for producing a processed meat product such as ham, sausage, bacon, corned beef, hamburger steak, minced meat, meat ball, chicken ball, Chinese meat ball, shrimp dumpling, shrimp ball, fish ball and kamaboko, chikuwa and oden-dane (fish-paste products), which comprises blending 0.1 to 40 parts by weight, on a solid basis, of a proteinous material produced by the process of the present invention with 100 parts by weight of a meat such as fish meat, chicken, beef, pork, mutton or whale meat; optionally adding other materials such as seasonings, spices or colorants thereto; and blending the resulting mixture with, for example, the abovementioned animal or vegetable fat sources, animal protein sources, vegetable protein sources, carbohydrate sources and/or luxuries, vegetables, meat or fish.

(19) A process for producing tofu, which comprises blending 5 to 80 parts by weight, preferably 15 to 30 parts by weight, on a solid basis, of a proteinous material produced by the process of the present invention with 100 parts by weight of a soybean milk powder.

(20) A process for producing konnyaku (devil's tongue), which comprises blending 10 to 800 parts by weight, preferably 50 to 200 parts by weight, on a solid basis, of a proteinous material produced by the process of the present invention with 100 parts by weight of a konjaku powder.

(21) A process for producing Western dishes such as terrine or quenelle, which comprises blending 20 to 500 parts by weight, preferably 50 to 200 parts by weight, on a solid basis, of a proteinous material produced by the process of the present invention with 100 parts by weight of ground fish meat.

(22) A process for producing a tofu-like food, which comprises blending 100 parts by weight of a proteinous material produced by the process of the present invention with 50 to 150 parts by weight of ground fish meat and 10 to 50 parts by weight, on a solid basis, of a vegetable protein and/or 20 to 50 parts by weight of eggs, provided that the proteinous material produced by the process of the present invention amounts to 5 to 50% by weight, preferably 10 to 30% by weight, of the total product; and heating the obtained mixture.

EXAMPLES

To further illustrates the present invention, and not by way of limitation, the following Examples will be given.

Example 1

Fish bodies of buna salmon, from which the internals, skins and fins had been removed, were cut with a block cutter (mfd. by Sakura Seisakusho K.K.) and treated with a chopper via a screw conveyer twice to give a minced fish meat containing bones.

To the coarsely ground minced fish meat, 20% by weight of water was added and thoroughly mixed.

The resulting fish meat containing bones was fed to a mass colloider (a fine-grinding device; mfd. by Masuko Seisakusho K.K.) via a pipe and treated therewith twice to thereby adjust the particle size of the fish bones to 50 μ or less.

The finely ground bone-containing fish meat was introduced into an enzymatic decomposition tank (mfd. by Stefan). Vitamin E was added thereto in such an amount as to give a concentration of 500 ppm based on the fat component of the aimed final product. The resulting mixture was stirred at a low rate which running warm water through the jacket to thereby elevate the temperature of the material to 50° C. When the temperature reached 50° C., the temperature of the warm water running through the jacket was adjusted to 50° C.

Then 0.1% by weight of a protease "Protin AC-10" (mfd. by Daiwa Kasei K.K.) dissolved in a small amount of distilled water was added thereto. After the completion of the addition, the resulting mixture was stirred at a high rate and maintained at 50° C. for 30 minutes. Then the temperature of the material was rapidly elevated to 75° C. by running warm water at 85° C. through the jacket to thereby inactivate the enzyme.

The product thus obtained was in the form of a paste comprising 79% by weight of water and not more than 1% by weight of fats. Water-soluble proteins in the product amounted to 34% by weight of the total proteins. Peptides of 40,000 to 70,000 in molecular weight contained therein amounted to 75% by weight based on the total peptides except water-soluble ones and amino acids.

This product was pasteurized on an On-reiter (tradename of a heat sterilizer mfd. by Sakura Seisakusho K.K.) at 100° C. for ten minutes. The resulting product showed a general bacterial count not more than 300 cells/g.

Then the pasteurized product was packed in 5-kg portions with a packing machine (mfd. by Jonan Seisakusho K.K.) and frozen and stored in a refrigerator.

Separately the pasteurized product was dried on a drum drier at 70° C. and powdered to thereby give a powdery product.

Example 2

The internals, ink sac, eyes and mouths were removed from cuttlefish and the remaining trunks and tentacles were thoroughly washed with water and drained. Some portion of the material was roasted on charcoal to impart a roast-like odor thereto.

The trunks and tentacles were mixed together and treated with a chopper to thereby give a pasty minced cuttlefish meat.

This minced meat was treated with a mass colloider to thereby adjust a particle size, in particular that of the tendons contained therein, to 50 μ or less. This particle size was satisfactorily achieved by treating the minced meat with the mass colloider only once.

The finely ground cuttlefish meat thus obtained was introduced into an enzymatic decomposition tank and stirred at a low rate while running warm water through the jacket to thereby elevate the temperature of the material to 50° C. When this temperature reached 50° C., the temperature of the warm water running through the jacket was adjusted to 50° C. Then 0.025% by weight of a protease "Amano A" (mfd. by Amano Pharmaceutical Co., Ltd.) dissolved in a small amount of distilled water was added thereto. After the completion of the addition, the mixture was stirred at a high rate and maintained for 15 minutes. Then the temperature of the material was elevated to 65° C. by running warm water at 75° C. through the jacket to thereby inactivate the enzyme.

The obtained product was in the form of a paste comprising 78% by weight of water and having an excellent eating texture and a roast-like odor. Water-soluble proteins contained in the product amounted to 28% by weight of the total proteins. Peptides of 40,000 to 70,000 in molecular weight contained therein amounted to 55% by weight based on the total peptides except water-soluble ones and amino acids.

This product was pasteurized on an On-reiter at 100° C. for ten minutes. The pasteurized product had a general bacterial count of not more than 300 cells/g.

The pasteurized product was slowly dried in a drum drier by blowing an air stream at 70°C. thereto and then ground. Thus a powdery cuttlefish product having a roast-like odor and containing 5% by weight of moisture was obtained.

Example 3

Thoroughly washed short-necked clams with shells were blended with the same amount of shelled short-necked clams. The mixture was treated with steam at 100° C. for ten minutes, thus simultaneously pasteurizing the same and inactivating the enzymes contained in the shellfish per se.

The obtained mixture was coarsely ground by treating with a chopper thrice to thereby give a minced material comprising shells as well as meat.

This minced material was introduced into a mixing tank and the drained water containing the short-necked clam extract, obtained in the steam-heating step as described above, was added thereto. The resulting mixture was thoroughly mixed.

This mixture was fed into a mass colloider via a pipe and treated therewith thrice to thereby adjust the particle size, in particular that of the contained shells, to 60 $\mu$ or less.

To the finely ground short-necked clam mixture thus obtained, vitamins E and C were added in such amounts as to give concentrations of 500 ppm and 100 ppm, respectively, based on the fat component of the aimed final product. The resulting mixture was introduced into an enzymatic decomposition tank and stirred at a low rate while running warm water through the jacket to thereby elevate the temperature of the material to 50° C.

When this temperature reached 50° C, the temperature of the warm water running through the jacket was adjusted to 50° C. and 0.03% by weight of a protease "Protin AC-10" dissolved in a small amount of distilled water was added thereto. After the completion of the addition, the mixture was stirred at a high rate and maintained for 15 minutes. Then the temperature of the material was rapidly elevated to 80° C. by running warm water at 85° C. through the jacket to thereby inactivate the enzyme.

The product thus obtained was in the form of a paste having such a smooth eating texture as to make the presence of the shells hardly noticeable. Water-soluble proteins contained therein amounted to 28% by weight based on the total proteins. Peptides of 40,000 to 70,000 in molecular weight amounted to 65% by weight based on the total peptides except water-soluble ones and amino acids.

This product was pasteurized on an On-reiter at 100° C. for ten minutes. The general bacterial count of the obtained product was not more than 300 cells/g.

Then the pasteurized product was packed, frozen and stored.

Separately, 50% by weight of enzymatically decomposed dextrin was added to the pasteurized product. The resulting mixture was dried by blowing an air stream at 180° C. thereto from a spray drier. Thus a powdery product, which had a smooth eating texture and a taste of short-necked clam, was highly dispersible in water and contained 5% by weight of moisture, was obtained. Example 4

Thoroughly washed codfish bodies, from which the internals, skins and fins had been removed, were treated with a chopper (mfd. by Hanaki Seisakusho K.K.) thrice to give a minced meat.

The minced meat containing bones was introduced into an enzymatic decomposition tank. Then vitamins C and E were added thereto in such amounts as to give concentrations of 100 ppm and 500 ppm, respectively, based on the fat component in the aimed final product. The resulting mixture was stirred at a low rate.

Then the temperature of the material was elevated to 50° C. by running warm water at 50° C. through the jacket. 0.05% by weight of a protease "Amano A" (mfd. by Amano Pharmaceutical Co., Ltd.) dissolved in a small amount of water was added thereto. After the completion of the addition, the mixture was stirred at a high rate and maintained at a temperature of the material of 50° C. for 25 minutes. Then the temperature was rapidly elevated to 75° C. by running warm water at 85° C. through the jacket to thereby inactivate the enzyme.

The product thus treated with the enzyme was in the form of a paste comprising 65% by weight of water and not more than 3% by weight of fats. Water-soluble proteins contained therein amounted to 32% by weight of the total proteins contained therein. Peptides of 40,000 to 70,000 in molecular weight amounted to 69% by weight based on the total peptides other than water-soluble ones and amino acids.

The enzymatically treated paste product still showed a somewhat coarse feel caused by the fish bones. Thus it was further fed into a mass colloider and finely ground therewith twice to thereby adjust the particle size, in particular that of fish bones, to 80 $\mu$ or less.

After finely grinding, the product was pasteurized with an On-reiter at 100° C. for ten minutes. The general bacterial count of the pasteurized product was not more than 300 cells/g.

After the pasteurization, the product was packed in 5-kg portions and frozen and stored in a refrigerator at $-30°$ C.

Example 5

Codfish bodies, from which the internals, skins and fins had been removed, were treated with a chopper twice to thereby give a minced meat. The coarsely ground minced meat containing fish bones, thus obtained, was combined with 10% by weight of water and thoroughly mixed.

The bone-containing fish meat was fed into a mass colloider via a pipe and treated therewith twice to thereby adjust the particle size, in particular that of the fish bones, to 50 $\mu$ or less.

The finely ground bone-containing fish meat was introduced into an enzymatic decomposition tank. Then vitamins C and E were added thereto in such amounts as to give concentrations of 100 ppm and 500 ppm, respectively, based on the fat component in the aimed final product. The resulting mixture was stirred at a low rate while running warm water at 50° C. through the jacket to thereby elevate the temperature of the material to 50° C. Then 0.01% by weight of a protease "Pro ADX-25" (mfd. by Asahi Denka K.K.) dissolved in a small amount of distilled water was added thereto. The resulting mixture was stirred at a high rate and maintained at 50° C. for 15 minutes. Then the temperature of the material was rapidly elevated to 75° C. or above by running warm water at 85° C. through the jacket to thereby inactivate the enzyme.

Separately, *Streptococcus lactis* and *Lactobacillus bulgaricus* were inoculated into a 10% aqueous solution of skim milk and cultured at 37° C. for 24 hours to thereby give a starter.

After inactivating the enzyme, the mixture was stirred at a low rate while running warm water at 40° C. through the jacket to thereby adjusting the temperature of the material to 40° C. 5% by weight of the lactic acid bacteria starter was added thereto and the resulting mixture was stirred at a high rate for five minutes. After ceasing the stirring, the mixture was maintained at 40° C. for eight hours.

The enzymatically treated and fermented product thus obtained was in the form of a paste comprising 81% by weight of water and not more than 1% by weight of fats. Water-soluble proteins contained therein amounted to 36% by weight of the total proteins. Peptides of 40,000 to 70,000 in molecular weight amounted to 78% by weight of the total peptides except water-soluble ones and amino acids.

The fermented product was immediately pasteurized with an On-reiter at 100° C. for 15 minutes, packed in 5-kg portions and then frozen and stored at −30° C.

Example 6

A thoroughly washed scallop mixture comprising 50 parts of taeniae, 30 parts of spat and 20 parts of shells was pasteurized by steaming at 100° C. for ten minutes to thereby inactivate the enzymes contained in the taeniae and spat per se. Then the mixture was frozen.

The mixture was coarsely ground by treating with a chopper thrice to thereby give a minced material containing the shells, taeniae and spat.

This minced material was introduced into a mixing tank and the drain containing the scallop extract obtained in the steaming step was added thereto. The resulting mixture was thoroughly mixed.

The mixture was fed into a mass colloider (mfd. by Masuko Seisakusho K.K.) via a pipe and treated therewith thrice to thereby adjust the particle size, in particular that of the shells, to 80 $\mu$ or less.

To the finely ground scallop mixture, vitamins E and C were added in such amounts as to give concentrations of 500 ppm and 100 ppm, respectively, based on the fat component in the aimed final product. The mixture thus obtained was introduced into an enzymatic decomposition tank and stirred at a low rate while running warm water through the jacket to thereby elevate the temperature of the material to 50° C.

When this temperature reached 50° C, the temperature of the warm water running through the jacket was controlled to 50° C. and 0.02% by weight of a protease "Amano A" dissolved in a small amount of distilled water was added thereto.

After the completion of the addition, the mixture was stirred at a high rate and maintained for 20 minutes. Then the temperature of the material was rapidly elevated to 80° C. by running warm water at 85° C. through the jacket to thereby inactivate the enzyme.

The product thus obtained was in the form of a paste having such a smooth eating texture as to make the presence of the shells hardly noticeable.

Water-soluble proteins contained in the product amounted to 36% by weight based on the total proteins. Peptides of 40,000 to 70,000 in molecular weight amounted to 67% by weight based on the total peptides except water-soluble ones and amino acids.

This product was pasteurized with an On-reiter at 100° C. for ten minutes. The pasteurized product showed a general bacterial count not more than 300 cells/g.

After the pasteurization, the product was continuously packed with a packing machine (mfd. by Jonan Seisakusho K.K.), frozen and stored.

Separately, 30% by weight of dextrin was added to the pasteurized product and thoroughly mixed. The resulting mixture was dried by blowing a hot air stream at 180° C. thereto from a spray dryer. Thus a powdery product containing 6% by weight of moisture, which had a smooth eating texture and a scallop-like taste and was highly dispersable in water, was obtained.

Example 7

A thoroughly washed mixture comprising 50 parts of eel heads and 50 parts of eel bones was coarsely ground by treating with a chopper twice to thereby give a minced material.

This minced material was introduced into a mixing tank. Then vitamins E and C were added thereto in such amounts as to give concentrations of 500 ppm and 100 ppm, respectively, based on the fat component in the aimed final product. The resulting mixture was fed into a mass colloider via a pipe and treated therewith twice to thereby adjust the particle size, in particular that of bones, to 60 $\mu$ or less.

The finely ground material was introduced into an enzymatic decomposition tank and stirred at a low rate while running warm water through the jacket to thereby elevate the temperature of the material to 50° C.

When this temperature reached 50° C, the temperature of the warm water running through the jacket was adjusted to 50° C. 0.05% by weight of a protease "Protin AC-10" dissolved in a small amount of distilled water was added to the material.

After the completion of the addition, the mixture was stirred at a high rate and maintained for 20 minutes. Then the temperature of the material was rapidly elevated to 80° C. by running warm water at 85° C. through the jacket to thereby inactivate the enzyme.

The product thus obtained was in the form of a paste having such a smooth eating texture as to make the presence of the bones hardly noticeable.

Water-soluble proteins contained in the product amounted to 39% by weight based on the total proteins. Peptides of 40,000 to 70,000 in molecular weight contained therein amounted to 70% by weight based on the total peptides except water-soluble ones and amino acids.

This product was pasteurized with an On-reiter (mfd. by Sakura Seisakusho K.K.) at 100° C. for ten minutes. The pasteurized product had a general bacterial count of not more than 300 cells/g.

After the pasteurization, the product was continuously packed with a packing machine, frozen and stored.

Separately the pasteurized product was dried with a drum dryer at 70° C. and ground with a mill. Thus a powdery product containing 7% by weight of moisture, which had a smooth eating texture and an eel-like taste and was highly dispersible in water, was obtained.

Example 8

Codfish bodies, from which the internals, skins and fins had been removed, were treated in the same manner as the one described in Example 1 to thereby give a finely ground composition (i.e., a codfish meat slurry). 10 kg of the finely ground composition was sterilized with a high-pressure sterilizer at 120° C. for three seconds and then introduced into a Stefan UM12. 1 kg of a culture medium of lactic acid bacteria, which had been preliminarily prepared by culturing *Streptococcus lactis* and *Lactobacillus bulgaricus* together, each provided by Ferment. Inst. of Osaka Univ., in a milk medium, thereto. Then 5 g of a proteinase "Amano A" (mfd. by Amano Pharmaceutical Co., Ltd.) dissolved in a small amount of sterilized water was further added thereto.

After the completion of the addition, the resulting mixture was stirred at a low rate for three hours while maintaining the temperature of the material at 45±2° C. by running warm water at 45° C. through the jacket. Then the temperature of the water running through the jacket was elevated to 95° C. and this temperature was maintained for 30 minutes thus simultaneously inactivating the proteinase and decreasing the number of the cells of the lactic acid bacteria. Then the temperature of the material was lowered to 10° C. by running ice-water through the jacket.

Thus a proteinous material in the form of a white paste having a somewhat excellent aroma and a solid content of 20% by weight, which was the aimed product of the present invention, was obtained.

This white paste proteinous material contained water-soluble proteins (in a trichloroacetic acid solution) of 45% by weight based on the total proteins contained therein.

Example 9

Red salmon bodies, from which the internals, skins and fins had been removed, were cut with a block cutter, ground with a freezing chopper and then finely ground with a mass colloider (mfd. by Masuko Sangyo K.K.) at a grinder clearance of 10 mm and then 3 mm to thereby given a particle size not more than 100 $\mu$. The temperature of the material was maintained around 30° C. by running cooling water through the mass colloider.

The finely ground salmon fish still showed a coarse feel and a poor taste. 20 kg of this finely ground composition, i.e., the salmon meat slurry was introduced into a Stefan UM12 (mfd. by Stefan) together with 5 kg of soybean protein and 5 kg of corn starch. The temperature of the resulting mixture was controlled to 50° C. by running warm water at 50° C. through the jacket. When this temperature reached 50° C, 20 g of a proteinase "Amano A" and 3 g of lysozyme, which was employed in order to inhibit the growth of contaminating bacteria, each dissolved in a small amount of distilled water, were added thereto.

After the completion of the addition, the temperature of the finely ground composition was stirred for 30 minutes at a high rate while maintaining the temperature thereof at 50±2° C. Then the temperature of the water running through the jacket was elevated to 95° C. to thereby inactivate the proteinase. Subsequently the temperature of the composition was lowered to 10° C. by running ice-water through the jacket.

Thus a proteinous material in the form of a red viscous paste having a solid content of 40% by weight and containing starch, which was the aimed product of the present invention, was obtained.

This red viscous paste containing starch comprised water-soluble proteins (in a trichloroacetic acid solution) of 25% by weight based o the total proteins contained therein.

Example 10

Codfish bodies, from which the internals, skins and fins had been removed, were cut with a block cutter, fed into a chopper (mfd. by Hanaki Seisakusho K.K.) via a screw conveyer and treated with said chopper twice to thereby give a minced fish meat containing bones.

This fish meat was introduced into a double-wall mixing tank and the temperature of the material was adjusted to 40° C. by running warm water at 40° C. between the walls. Then 5% by weight of a lactic bacterium (*Streptococcus lactis*), which had been cultured in a skim milk medium, and 1% by weight of skim milk were added thereto. Simultaneously 0.02% by weight of a proteinase "Protin AC-10" (mfd. by Daiwa Kasei K.K.) dissolved in a small amount of water and vitamins E and C, which were employed in such amounts as to give concentrations of 500 ppm and 200 ppm, respectively, based on the fat component in the aimed final product, were added thereto and the resulting mixture was mixed.

The obtained fish meat mixture containing bones was fed into a mass colloider via a pipe and treated therewith twice to thereby adjust the particle size, in particular, that of the fish bones, to 80 $\mu$ or less.

The obtained material was pasteurized on an Onreiter at 100° C. for ten minutes.

After the pasteurization, the product was packed in 5-kg portions with a packing machine (mfd. by Jonan Seisakusho K.K.) and frozen and stored in a refrigerator at −30° C.

Separately the pasteurized product was dried with a drum dryer by blowing a hot air stream at 70° C thereto. Thus a product in the form of a snow-white powder was obtained.

Example 11

Codfish bodies, from which the internals, skins and fins had been removed, were cut with a block cutter and treated with a chopper (mfd. by Hanaki Seisakusho K.K.) via a screw conveyer twice to thereby give a minced fish meat containing bones.

The bone-containing minced fish meat was introduced into a double-wall mixing tank and 5% by weight of lactic acid bacteria, i.e., *Streptococcus lactis* and *Streptococcus cremoris*, which had been preliminarily cultured in a skim milk medium, and 1% by weight of skim milk were added thereto. The resulting mixture was mixed while running warm water at 40° C. between the walls to thereby elevate the temperature thereof to 40° C. Simultaneously vitamins E and C were added thereto in such amounts as to give concentrations of 500 ppm and 200 ppm, respectively, based on the fat component in the aimed final product.

The bone-containing fish meat mixture containing the lactic acid bacteria was fed into a mass colloider via a pipe and treated therewith to thereby adjust the particle size, in particular, that of the fish bones to 50 $\mu$ or less.

The product thus obtained was in the form of a paste comprising 81% by weight of water and not more than 0.5% by weight of fats. Water-soluble proteins contained therein amounted to 29% by weight based on the total proteins. Peptides of 40,000 to 70,000 in molecular weight contained therein amounted to 60% by weight based on the total peptides except water-soluble ones and amino acids.

After treating with the mass colloider, the product was pasteurized with an On-reiter at 100° C for ten minutes.

The general bacterial count of this product was not more than 300 cells/g.

After the pasteurization, the product was packed in 5-kg portions with a packing machine (mfd. by Jonan Seisakusho K.K.) and frozen and stored in a refrigerator at −30° C.

Separately the pasteurized product was dried with a drum dryer by blowing a hot air stream at 70° C thereto to thereby give a product in the form of a snow-white powder.

Example 12

Codfish bodies, from which the internals, skins and fins had been removed, were cut with a block cutter, fed into a chopper (mfd. by Hanaki Seisakusho K.K.) via a screw conveyor and treated therewith twice to thereby give a minced fish meat containing bones.

The bone-containing minced fish meat was introduced into a double-wall mixing tank and 5% by weight of hot water was added thereto. The resulting mixture was thoroughly mixed while running hot water between the walls to thereby elevate the temperature of the mixture to 45° C. When this temperature reached 45° C, vitamins E and C were added thereto in such amounts as to give each a concentration of 500 ppm based on the fat component in the aimed final product. Then 0.05% by weight of a proteinase "Protin AC-10" (mfd. by Daiwa Kasei K.K.) and 0.1% by weight of another proteinase "Amano A" (mfd. by Amano Pharmaceutical Co., Ltd.), each dissolved in a small amount of water, were added thereto and mixed.

The resulting bone-containing fish meat mixture was fed into a mass colloider via a pipe and treated therewith twice to thereby adjust the particle size, in particular, that of the fish bones, to 80 $\mu$ or less. Approximately 20 minutes were taken from the addition of the enzymes to the completion of the treatment with the mass colloider.

The product thus obtained was in the form of a paste comprising 82% by weight of water and not more than 0.5% by weight of fats. Water-soluble proteins contained in the product amounted to 39% by weight based on the total proteins contained therein. Peptides of 40,000 to 70,000 in molecular weight contained therein amounted to 70% by weight based on the total peptides except water-soluble ones and amino acids.

This product was treated with a mass colloider and then immediately treated with an On-reiter at 100° C. for ten minutes, thus simultaneously pasteurizing the same and inactivating the enzymes. The pasteurized product showed a general bacterial count not more than 300 cells/g and the enzymes contained therein were completely inactivated.

After the pasteurization, the product was packed in 5-kg portions with a packing machine (mfd. by Jonan Seisakusho K.K.) and frozen and stored with a refrigerator at −30° C.

Separately 20% by weight of an enzymatically decomposed dextrin "Toyoderin" was added to the pasteurized product and the resulting mixture was spray-dried to thereby give a product in the form of a snow-white powder.

Example 13: Preparation of scallop bar 300 g of the proteinous material in the form of a pale yellow paste, as prepared in Example 6, 700 g of ground codfish meat and 2 g of common salt were thoroughly kneaded with a Robot Coupe (mfd. by Robot Coupe) at a temperature not higher than 10° C. Then the kneaded material was extruded from a nozzle having a gauzy tip into boiling water and solidified to thereby give a fibrous composition. On the other hand, 500 g of the proteinous material in the form of a white paste, as prepared in Example 4, 500 g of ground codfish meat and 2 g of common salt were kneaded with a Robot Coupe (mfd. by Robot Coupe) at a temperature of the material not higher than 10° C. The obtained mixture was spread onto a moist cloth in a thickness of approximately 3 mm. The fibrous composition as prepared above was placed thereon and wrapped therewith. Thus a product in the form of a bar containing the fibrous composition as the core was obtained. Then the product on the cloth was steamed as such at the boiling temperature for approximately 30 minutes.

After the completion of the steaming, a scallop bar product, which had an excellent scallop taste and contained 30 to 45% of scallops, was obtained. This product was not coarse but showed a smooth texture. Example 14: Preparation of spaghettis 130 g of the proteinous material in the form of a pale brown paste, as prepared in Example 3, 300 g of semi-hard wheat flour, 3 g of common salt, 10 g of gluten and 5 g of lecithin were mixed together in a mixing tank of a test noodle-making machine for 30 minutes until the mixture was hardened into a mass when clasped with a hand. Then the mixture was pressed twice or thrice at a roll clearance of 5. Thus the powdery mixture was pressed into a narrow strip. Then the narrow strip was folded to give a two-layer product at a roll clearance of 6. This procedure was repeated three or four times and then the material was kneaded and pressed. Finally the material was pressed twice at a roll clearance of 4 to thereby give a product in the form of a narrow strip. This product was cut with a teeth-cutter (3 mm × 3 mm) to thereby give spaghettis of 3 mm square.

These spaghettis were boiled in a conventional manner. After placing fried short-necked clams thereon, the spaghettis were taken by way of trial. As a result, the spaghettis showed an appropriate hardness, an excellent taste of short-necked clam and a smooth texture.

Example 15: Preparation of drink 100 g of the proteinous material as obtained in Example 4 was introduced into a beaker. Then 3 g of gum arabic, 1 g of carboxymethyl cellulose of a low viscosity, which will be abbreviated to CMC hereinafter, 30 g of sucrose and 0.5 g of citric acid dissolved in 100 g of water were added thereto. The resulting mixture was homogeneously blended with a homomixer to give a solution. Then 10 g of corn oil was emulsified into said solution at a high rate and 200 g of water was added thereto and homogeneously mixed. The resulting mixture was pasteurized at 100° C. for 30 minutes and then cooled to 40° C. Subsequently an appropriate amount of an orange essence was added thereto to thereby give a drink. The drink thus obtained was in the form of a milky drink having an orange flavor.

Example 16: Preparation of drink 100 g of the proteinous material as obtained in Example 8 was introduced into a beaker. Then 300 g of water, 15 g of sucrose and 2 g of CMC were added thereto to prepare a solution by using a homomixer. Then 300 g of soy milk was further added thereto to give a drink. This drink had good body and a characteristic flavor which was never observed in conventional ones.

Example 17: Preparation of drink 100 g of the proteinous material as obtained in Example 3 was introduced into a beaker. Then 3 g of gum arabic, 30 g of sucrose and 0.5 g of citric acid dissolved in 100 g of water were added thereto. The mixture was homogeneously mixed with a homomixer to thereby give a solution. Then 10 g of corn oil was emulsified into said solution at a high rate and 200 g of water was further added thereto. The resulting mixture was homogeneously mixed. Furthermore 100 g of orange juice was added thereto to thereby give a drink. The obtained product was in the form of a milky drink having an orange flavor.

Example 18: Preparation of drink

Buna salmon bodies, from which the internals, skins and fins had been removed, were coarsely ground and then finely ground into particles of a size not more than 100 $\mu$. 100 g of the product thus obtained was thawed and mixed with 3.0 g of common salt and 0.2 g of sodium pyrophosphate. The resulting mixture was kneaded with an agitation mill provided with a temperature-controlling jacket and a stirrer to thereby give a pasty product. The temperature of the pasty material was elevated to 50° C. by running warm water through the jacket. 0.05 g of a proteinase "Amano A" and 50 ppm of lysozyme for inhibiting the growth of contaminating bacteria, each dissolved in a small amount of water, were added thereto. After the completion of the addition, the mixture was stirred at a high rate and kneaded for 15 minutes while maintaining the same at 50° C. After 15 minutes, 10 g of skim milk was immediately added thereto and the stirring was continued for additional 15 minutes. Then the jacket temperature was immediately elevated to 80° C. and this temperature was maintained for 30 minutes to thereby inactivate the enzyme. Then water was added to the pasty material in such an amount as to give a solid concentration thereof of 9 to 10% by weight. The resulting mixture was stirred with a homomixer, pasteurized at 90 to 95° C. for five minutes and then cooled to 37° C. 3 g of a starter comprising a mixture of *Lactobacillus bulgaricus* with *Streptococcus thermophilus*, which had been preliminarily cultured, was added thereto and the obtained mixture was fermented in a thermostat at 37° C. for six hours. Separately 5 g of sucrose was mixed with 3 g of an asparagus extract and 0.2 g of ascorbic acid under sterile conditions. The resulting mixture was homogeneously mixed with the abovementioned fermented material in a homomixer, cooled and poured into containers by portions to thereby give a drink. This drink showed a stable growth of the bacteria and had a refreshing feel.

Example 19: Preparation of drink

Codfish bodies, from which the internals, skins and fins had been removed, were coarsely ground and then finely ground into particles of a size not more than 100 $\mu$. 100 g of this material was thawed and the temperature thereof was elevated to 50° C. in an agitation mill provided with a temperature-controlling jacket and a stirrer while stirring. 3 g of a refined fish oil containing 20% of eicosapentaenoic acid, 0.5 g of α-tocopherol and 5 g of a spray-dried yogurt powder were added thereto. The resulting mixture was stirred at a high rate while slowly adding water thereto in such a manner as to give a solid content of 9 to 10%. 0.05-g portions of proteinases "Pronase" (mfd. by Kaken Chemical Co., Ltd.) and "Amano A" and 50 ppm of lysozyme, which was used in order to inhibit the growth of contaminating bacteria, each dissolved in a small amount of water, were added thereto. After the completion of the addition, the mixture was kneaded by stirring at a high rate at 50° C. for 15 minutes. After 15 minutes, 10 g of skim milk was added thereto and the stirring was continued at 50° C. for additional 15 minutes. Then the temperature of the jacket was immediately elevated to 80° C. and this temperature was maintained for 30 minutes to thereby inactivate the enzymes. Separately 3 g of an asparagus extract, 0.2 g of ascorbic acid and 0.5 g of citric acid were blended together under sterile conditions. The resulting mixture was homogenized with the enzymatically decomposed material as obtained above with a homomixer. This material was pasteurized at 95° C. for five minutes, cooled and poured into sterile containers by portions to thereby give a drink. This drink formed an excellent emulsion with an oil and had a refreshing feel.

Example 20: Preparation of petit bun 10 g of live yeast was dissolved in 40 cc of warm water. Separately a large spoonful of skim milk, a large spoonful of sugar and a ⅔ small spoonful of common salt were dissolved in 50 cc of warm water. These solutions were combined together and further mixed with 60 g of the proteinous material as prepared in Example 5 and a half of an egg. The resulting mixture was added to 200 g of hard wheat flour and kneaded. A large spoonful of butter was further added thereto and thoroughly kneaded. Then the mixture was fermented at 130° C. for 40 to 50 minutes. Then it was degassed, divided into six to eight portions, rounded and aged. Then each portion was formed into a leaf-shape and fermented on an oven plate at 38° C. for 40 minutes. Finally it was baked in an oven at 180 to 190° C. for 13 minutes to thereby give a petit bun.

This petit bun had an excellent appearance, a nice smell and a good taste.

Example 21: Preparation of cream puff coating 90 cc of water and 35 g of butter were introduced into a pot and heated. When the mixture came to boil, 60 g of soft wheat flour was added thereto and quickly mixed. When a smooth mass was formed, the heating was stopped. Then 30 g of the proteinous material as prepared in Example 1 and two eggs were added thereto and the resulting mixture was kneaded until a viscous dough was obtained. This dough was placed on an oil-coated oven plate with a spoon by portions and baked in an oven at 200° C. for ten minutes. When the dough was colored, the baking temperature was lowered to 180° C. and the baking was continued for additional eight minutes to thereby give a cream puff coating.

This coating had an excellent appearance, a nice small and a good taste.

Example 22: Preparation of okonomiyaki 150 g of soft wheat flour, a 4/3 cup of water and an appropriate amount of common salt were thoroughly mixed together. Then an egg and 100 g of the proteinous material as obtained in Example 2 were added thereto to thereby give a dough. Some portion of this dough was roasted on a hot plate. Cabbage pieces, Welsh onion pieces, dried shrimps and green layer were placed thereon and the obtained material was covered with the residual dough. The product was turned over and further roasted to thereby give an okonomiyaki.

This okonomiyaki had an excellent appearance, a nice smell and a good taste.

Example 23: Preparation of bread crumbs

To 200 g of hard wheat flour, 4 g of common salt, 10 g of sugar and 4 g of skim milk dissolved in 60 cc of hot water as well as 20 g of the proteinous material as obtained in Example 9 were added. The resulting mixture was kneaded while further adding 4 g of yeast dissolved in 60 cc of warm water, 0.2 g of yeast food and 10 g of shortening. The obtained mixture was thoroughly kneaded. Then the material was fermented at 30° C. for approximately one hour, degassed, further fermented at 30° C. for approximately one hour and degassed to thereby give a dough. Then the dough was baked in an oven at 200° C. for 20 minutes. The bread thus obtained was dried and milled to thereby give bread crumbs.

These bread crumbs had a nice smell and a good taste.

Example 24: Preparation of cracker 50 g of sieved wheat flour, 20 g of water, 0.2 g of yeast and 0.4 g of common salt were introduced into a container, thoroughly mixed and kneaded to thereby give a dough. This dough was fermented at 30° C. for ten hours. Separately 150 g of wheat flour was introduced into another container and 25 g of shortening was kneaded therewith. Further 1.5 g of common salt, 0.6 g of sodium bicarbonate and 40 g of the proteinous material as prepared in Example 5 were added thereto and thoroughly mixed. To the resulting mixture, the fermented dough as obtained above was added and the obtained mixture was kneaded and fermented at 30° C. for four hours. Then it was spread over with a rolling pin in a thickness of approximately 0.5 mm, cut into pieces (3 cm×5 cm) and baked at 270° C. for three minutes to thereby give crackers.

These crackers had a good color of baking and a characteristic and excellent taste.

Example 25: Preparation of tofu and aburaage

To 300 g of a soy milk for the production of tofu, which had been prepared in a conventional manner and maintained at 80° C, 20 g of the proteinous material as obtained in Example 2 and 0.5 g of gum xanthan dissolved or dispersed in 50 g of water were added and the resulting mixture was homogenized. Then 37 g of solid nigari (brine) dissolved in 180 cc of water and 3 cc of a solidifier were added thereto and the mixture was thoroughly stirred. After 10 to 15 minutes, the mixture was introduced into a solidifying box covered with a cotton cloth and put under a lid. A stone was placed on the lid for pressing. When the contents showed an appropriate hardness, they were taken out together with the cloth and immersed in water for two hours. Then the product was cut into an appropriate size to thereby give a tofu.

This tofu had a characteristic flavor, an excellent texture and a good taste.

The tofu thus obtained was sliced and squeezed between cloth sheets. Then it was fried in oil. The aburaage thus obtained had an excellent color of baking and a good taste.

Example 26: Preparation of emulsified fat for kneading 500 g of the proteinous material as obtained in Example 9, 3 g of skim milk and 1 g of lecithin were introduced into a beaker. 100 g of water was added thereto and the resulting mixture was stirred at a low rate with a homomixer (mfd. by Nippon Kakoki K.K.). After the completion of the mixing, 500 g of salad oil was slowly added thereto while stirring the mixture at a high rate. After the completion of the addition, the resulting mixture was stirred for additional five minutes. Thus a viscous emulsified composition was obtained.

140 g of this emulsified composition was introduced into a container of a small whipper and 100 g of soft wheat flour, 100 g of sugar, 100 of eggs, 1 g of common salt, 1 g of baking powder and 2 g of rum were added thereto. The obtained mixture was beaten at a high speed for two minutes to thereby give a homogeneous cake dough.

Oil was thinly applied to a pound cake mold and a sheet of paper was placed therein. Then the above cake dough was introduced therein four-fifth fill and baked in an oven at approximately 170° C. for 40 minutes. Thus a pound cake was obtained.

This pound cake was tasty.

Example 27: Preparation of mochi 200 g of glutinous rice was washed, immersed in water overnight and then strained. Then it was steamed together with 60 g of the proteinous material as obtained in Example 2 and pounded with a mochi-making machine to thereby give a mochi dough. ⅔ of this mochidough was cut into rectangles, while the residual ⅓ thereof was cut into pieces, dried and fried in oil. Each product showed a good taste. In particular, the fried mochi was superior in the nice smell and good taste to conventional ones containing no proteinous material paste.

Example 28: Preparation of senbei (rice cracker)

To 500 g of rice flour, 100 g of the proteinous material as obtained in Example 5 and 300 g of water were added. After kneading, the resulting mixture was divided into approximately 15-g portions and steamed. Then these portions were combined together and thoroughly kneaded again. The obtained dough was cooled, spread with a rolling pin and rapped into circles of 5 cm in diameter. Each circular piece was dried and baked to thereby give a senbei.

This senbei had a nice smell, a good taste, an excellent appearance and an excellent texture.

Example 29: Preparation of nouilles 150 g of soft wheat flour, 1.5 g of common salt, the yolk of an egg (18 g), 45 g of the proteinous material as obtained in Example 4 and a half of a whole egg were thoroughly kneaded together and the resulting mixture was allowed to and for four hours while covering with a moist cloth sheet. Then it was coated with a powder, spread over in a thickness of 2 mm and cut into strips (8 cm×3 mm). These strips were boiled with a sufficient amount of boiling water containing an appropriate amount of common salt for three minutes. Then they were immersed in water and washed with water. Subsequently these boiled strips were fired with butter and seasoned with common salt, pepper and powdery cheese to thereby give tasty nouilles.

Example 30: Preparation of Chinese noodles:

To 500 g of wheat flour, 100 g of the proteinous material as obtained in Example 2, 35 g of water and 6 g of brine were added to thereby give a noodle dough. After aging for a period, this dough was pressed and cut to thereby give Chinese noodles.

These Chinese noodles were allowed to stand day and night and a given amount thereof were boiled for three minutes. Then these boiled Chinese noodles were introduced into a cup containing a hot soup and taken by way of trial. As a result, the Chinese noodle had a characteristic flavor, an appropriate hardness, a smooth texture and a good taste.

Example 31: Preparation of batter for fried food (1) 220 g of wheat flour was sieved twice.

(2) The yolk of an egg and common salt were introduced into a bowl and 30 g of the proteinous material as obtained in Example 5 was added thereto. Further milk was added by portions and the resulting mixture was mixed to give a smooth material.

(3) Salad oil was added to the obtained mixture and the resulting mixture was covered with a wrapping film and aged for approximately two hours.

(4) 300 g of fillets of white-meat fish such as plaice, flatfish or halibut, from which bones and skins had been removed, were cut into bites and slightly seasoned with salt and pepper.

(5) The albumen of an egg was introduced into a clean bowl and beaten. Then it was added to the mixture as obtained in (3) by portions to thereby give a batter.

(6) A clean oil was heated to a low-medium temperature. After wiping off the moisture, the fish slices were skewered and coated with the batter as obtained in 5). Then the fish slices were slowly fried in the oil while turning over to thereby avoid scorching.

Thus fritters of white meat fish, which were superior to conventional ones in taste and flavor and had an excellent texture, were obtained.

Example 32: Preparation of batter for fried food (1) To the yolk of an egg, as cold water as possible was added to give one cup-full volume. The resulting mixture was thoroughly mixed.

(2) 220 g of soft wheat flour was sieved twice and air was introduced thereto. Then the wheat flour was combined with the mixture as obtained in (1). 30 g of the proteinous material as obtained in Example 5 was further added thereto and the resulting mixture was mixed to a rather insufficient extent to thereby give a batter.

(3) Two peasecods were stringed and fried while the temperature of a frying oil was somewhat low.

(4) The stems of 7 to 8 cm long of two ginger plants were cut crosswise and coated with the batter as obtained in (2) together with two pickled ginger slices. These materials were fried following the above peasecods.

(5) One or two broccoli clusters were coated with the batter as obtained in (2) and fried in oil at 180° C.

(6) Two sardines, from which the internals and heads had been removed, were thinly coated with wheat flour and then with the batter as obtained in (2) and fried in oil at 180° C.

The tempuras thus obtained had good body, an excellent flavor, a good taste and an excellent texture, compared with conventional ones.

Example 33: Preparation of white sauce 20 g of butter was molten in a pot and 25 g of soft wheat flour was fried therewith for one to two minutes while avoiding scorching. Then 200 cc of hot milk was added thereto by portions and the mixture was thoroughly mixed to thereby prevent the formation of undissolved lumps. The proteinous material as obtained in Example 5 dissolved in 100 cc of a soup was added thereto. The resulting mixture was seasoned with 1 g of common salt and an appropriate amount of pepper and heated. When it came to boil, the heating was continued over a slow fire for 30 minutes while occasionally stirring.

Thus a tasty white sauce having a characteristic flavor was obtained.

Example 34: Preparation of spaghetti sauce 25 g of onion and 10 g of carrot were cut into small pieces and fried with 10 g of molten butter for two to three minutes. 40 g of the proteinous material as obtained in Example 6 and 10 g of wheat flour were added thereto and the resulting mixture was further fried. Then 90 cc of water, 15 cc of tomato ketchup, 1.5 g of salt, an appropriate amount of pepper and an appropriate amount of a synthetic flavoring were added thereto and the mixture was boiled until the volume thereof was reduced by half.

Thus a tasty spaghetti sauce having a characteristic flavor was obtained.

Example 35: Preparation of jangjang-men miso 150 g of the proteinous material as obtained in Example 9, 45 g of akamiso (red bean pate), 16 g of soy sauce, 16 g of sugar and 100 cc of water were thoroughly mixed together. 45 g of oil was heated in a pot and 28 g of Welsh onion pieces and 8 g of ginger pieces were fried therewith. When the spices smelled good, the abovementioned mixture was added thereto. When the resulting mixture came to boil, it was cooked on a slow fire until the oil separated out.

Thus the whole of minced pork conventionally employed in the preparation of a jangjang-men miso was replaced with the proteinous material as obtained in Example 9. The product thus obtained had an excellent and characteristic taste.

Example 36: Preparation of mayonnaise-like food 20 g of the proteinous material as obtained in Example 5, 2 g of common salt, 3.0 g of seasonings, 2.0 g of spices and 0.3 g of tamarind gum were dispersed and dissolved in 30 cc of water. 110 g of salad oil was slowly added thereto and the resulting mixture was emulsified with a homomixer. Then 30 g of vinegar was added thereto and the obtained mixture was further emulsified. Thus a mayonnaise-like emulsified food was obtained.

This mayonnaise-like emulsified food had a characteristic and excellent flavor and showed a stable emulsification.

Example 37: Preparation of emulsified food

Red salmon bodies, from which the internals, skins and fins had been removed, were coarsely ground and then finely grounded into particles of a size not more than 100 μ. 100 g of the material thus obtained, 30 g of vinegar and 0.1 g of an acidic proteinase "Newlase" (mfd. by Amano Pharmaceutical Co., Ltd.) were introduced into a temperature-controllable mixer. The mixture was stirred therein at a high rate for 30 minutes while maintaining at 50° C. Subsequently the temperature of the contents of the mixer was lowered to 15° C and 2 g of common salt, 1 g of CMC, 10 g of pepper and 10 g of onion powder were added thereto. 190 g of salad oil was slowly added to the mixture, while stirring the material at a high rate again to thereby give a mayonnaise-like food.

This emulsified food had a smooth texture and a good taste and suitable in the preparation of, for example, vegetable salad.

Example 38: Preparation of dressing-like food 6 g of corn starch, 1.5 g of tapioka, 34 g of 5% apple vinegar, 8.0 g of sugar, 2.5 g of common salt and 20 g of water were heated together while stirring to thereby give a starch paste. After cooling, the starch paste was homogenized together with 40 g of the proteinous material as obtained in Example 1, 3.0 g of common salt, 10 g of sugar and 1.0 g of mustard powder. Then salad oil was slowly added thereto, while emulsifying the resulting mixture by stirring to thereby give a dressing-like food.

This emulsified food had a characteristic flavor and a good taste and showed a stable emulsification.

Example 39: Preparation of dressing-like food

Codfish bodies, from which the internals, skins and fins had been removed, were coarsely ground and then finely ground into particles of a size not more than 100 μ. 100 g of the resulting material, 30 g of vinegar and 0.1 g of an acidic proteinase "Denapsin 2P" (mfd. by Nagase K.K.) were introduced into a temperature-controllable mixer and stirred at a high rate for 30 minutes while maintaining at 50° C. Then the temperature of the contents of the mixer was lowered to 15° C and 20 g of corn starch, 3 g of common salt, 5 g of pepper and 20 g of parsley pieces were added thereto. The resulting mixture was homogenized and 150 g of salad oil was slowly added thereto while stirring the mixture at a high rate again. Thus a salad dressing-like emulsified food was obtained.

This emulsified food had a smooth and good flavor and was suitable in the preparation of vegetable salad.

Example 40: Preparation of terrine 500 g of frozen ground Alaska pollack meat (SA) was ground with a silent cutter while adding 10 g of common salt thereto. Five minutes thereafter, 1200 g of the proteinous material as obtained in Example 9, 600 g of whole eggs, 300 cc of milk and 800 cc of fresh cream were added thereto. Then the resulting mixture was kneaded for ten minutes to thereby give 3710 g of a farce. To 1000 g of the farce thus obtained, 500 g of small blocks of raw salmon, 2 g of common salt and 1 g of white pepper were added. The obtained mixture was homogenized, introduced into a mold and steamed as such in an oven at 170° C. for 20 minutes to thereby give 1410 g of a terrine.

This terrine was satisfactory in the appearance, texture and taste and had a fine and smooth texture and a good taste.

Example 41: Preparation of terrine 500 g of frozen ground Alaska pollack meat (SA) was ground with a silent cutter while adding 10 g of common salt thereto. Five minutes thereafter, 1200 g of the proteinous material as obtained in Example 5, 600 g of whole eggs, 300 cc of milk and 800 cc of fresh cream were added thereto. Then the resulting mixture was kneaded for ten minutes to thereby give 3710 g of a farce. To 1000 g of the farce thus obtained, 500 g of boiled and strained carrot, 2 g of common salt and 1 g of white pepper were added. The obtained mixture was homogenized, introduced into a mold and steamed as such in an oven at 170° C. for 20 minutes to thereby give 1410 g of a terrine.

This terrine was satisfactory in the appearance, texture and taste and had a fine and smooth texture and a good taste.

Example 42: Preparation of mousse 200 g of frozen ground Alaska pollack meat (SA) and 100 g of water were ground with a silent cutter while adding 6 g of common salt thereto. Five minutes thereafter, 400 g of the proteinous material as obtained in Example 6, 400 g of albumen, 200 cc of fresh cream and 120 g of small scallop blocks were added thereto. Then the resulting mixture was kneaded until it became homogeneous. The resulting mixture was introduced into a mold and steamed as such in an oven at 200° C. for 20 minutes to thereby give 930 g of a mousse.

The obtained mousse was taken by ten panelists by way of trial together with sauce Americane. As a result, the appearance, texture and taste thereof were highly evaluated.

Example 43: Preparation of quenelle 200 cc of milk and 50 g of butter were heated together in a pot. When the butter was molten and the milk was ready to boil, 100 g of wheat flour was added thereto at once. The resulting mixture was vigorously stirred with a wood spatula until it formed a mass. Then the dough was dried on a moderate fire while stirring until a thin film was formed on the bottom of the pot. The dough was introduced into a bowl and 100 g of beaten eggs were added thereto by portions while stirring the dough with a wood spatula. After homogenizing the dough with the eggs, the obtained panade was allowed to stand in a cool place. 300 g of frozen ground Alaska pollack meat was ground with a silent cutter while adding 5.4 g of common salt thereto. Five minutes thereafter, 700 g of the proteinous material as obtained in Example 4, 200 g of small shrimp pieces, 450 g of the abovementioned panade and 200 cc of fresh cream were added thereto and thoroughly mixed together. The kneaded material was formed with a large spoon and dropped into a sufficient amount of boiling water. The dough, which once went down to the bottom and then came to the surface again, was cooked for five minutes and then cooled in cold water to thereby give 1670 g of quenelles.

These quenelles were taken by ten panelists by way of trial together with sauce Americane. As a result, the appearance, texture and taste thereof were evaluated as satisfactory.

Example 44: Preparation of Chinese corn soup 50 g of the proteinous material as obtained in Example 8 was combined with a small amount of ginger extract and 10 cc of sake. 230 g of a soup and 225 g of creamy sweet corn were heated in a pot and seasoned with salt and sake. Then 5 g of potato starch dissolved in 200 cc of water was added thereto under stirring. Slightly beaten albumen was added to the mixture as prepared above and roughly mixed. The resulting mixture was added to the heated material and quickly stirred. When the albumen was cooked, the heating was stopped.

Thus a Chinese corn soup wherein the taste of the proteinous material of the present invention matched with the flavor of corn was obtained.

Example 45: Preparation of baby food 30 g of the proteinous material as obtained in Example 5, 50 g cf a roughly drained grated radish, 6 cc of soy sauce, 6 cc of mirin and 70 cc of a soup stock, which had been preliminarily prepared, were steamed in a lidded pot on a relatively slow fire. When the material came to boil, an egg may be dropped therein, if required, to thereby give a food of an excellent appearance.

Thus an excellent baby food having the taste of the proteinous material of the present invention and a smooth texture was obtained.

Example 46: Preparation of well-cooked upon noodles 40 g of boiled upon noodles were washed with running water to thereby make the surface nonsticky. Then these noodles were quickly washed with hot water and cut into small pieces. Separately, 10 g of spinach was thoroughly boiled, drained and cut into pieces. The boiled noodles were sufficiently cooked in 100 cc of a soup stock and 30 g of the proteinous material as obtained in Example 7 and the abovementioned spinach were added thereto. The resulting mixture was quickly cooked and seasoned with 5 cc of soy sauce.

The well-cooked upon noodles thus obtained had an excellent taste wherein the taste and smooth texture of the proteinous material of the present invention were fully achieved.

Example 47: Preparation of meat loaf 30 g of loaf bread, 50 g of the proteinous material as obtained in Example 4, 300 g of minced beef, 30 g of onion, 50 g of egg, 4.4 g of salt and a small amount of pepper and a synthetic flavoring were mixed together and formed into a semicylindrical shape on a moist cloth. Then the product was placed on an oil-coated plate and 8 g of butter was placed thereon. The material was roasted at 180° C. for 25 minutes while pouring the exuding gravy thereon to thereby make the material glossy.

Thus a meat loaf excellent in the appearance and taste was obtained.

Example 48: Preparation of fish meat sausage 1000 g of frozen ground fish meat of grade B was ground with a silent cutter, while adding 700 g of the proteinous material as obtained in Example 1, 200 g of lard, 200 g of gelatin, 70 g of common salt, 5 g of Polygamy W(a natural flavoring), 300 g of corn starch, 2 g of a 1% solution of Red Colorant No. 106 and 0.8 g of a 1% solution of Yellow Colorant No. 5 were added thereto in a conventional manner under stirring. After thoroughly stirring, the mixture was subjected to a casing treatment in 80-g portions and pasteurized in boiling water to thereby give fish meat sausages.

These fish meat sausages had a smooth texture which was never observed in conventional ones.

Example 49: Preparation of konnyaku 70 g of the proteinous material as obtained in Example 6 was added to 350 ml of water and thoroughly stirred. 10 g of konjak flour was added thereto while slowly stirring. Then the mixture was covered and allowed to stand for approximately one hour to thereby sufficiently swell the konjak flour. Then the mixture was vigorously stirred while maintaining the temperature thereof at 70 to 80° C. to thereby sufficiently dissolve the konjak flour. 25 cc of a 2.5% solution of calcium hydroxide was added thereto and the mixture was quickly stirred, poured into an appropriate container and formed therein. When the formed mixture was sufficiently solidified, it was taken out from the container and heated in water at approximately 90° C. for 30 minutes or longer, i.e., leached, to thereby give a konnyaku.

This product was tasty.

Example 50: Preparation of konnyaku 10 g of konjak flour was added to 350 ml of water by portions while slowly stirring. Then the mixture was covered and allowed to stand for approximately one hour to thereby sufficiently swell the konjak flour. Then the mixture was vigorously stirred while maintaining the temperature thereof at 70 to 80° C. to thereby sufficiently dissolve the konjak flour. Then 70 g of the proteinous material as obtained in Example 4 was added thereto and the mixture was thoroughly homogenized. 25 cc of a 2.5% solution of calcium hydroxide was added thereto and the mixture was quickly stirred, poured into an appropriate container and formed therein. When the formed mixture was sufficiently solidified, it was taken out of he container and heated in water at approximately 90° C. for 30 minutes or longer, i.e., leached, to thereby give a konnyaku.

This product was tasty.

Example 51: Preparation of tofu-like food

To 100 g of separated soybean protein, 200 g of refined rapeseed oil and 400 g of water were added and thoroughly emulsified by mixing to thereby give a curd-type product. To 100 g of frozen ground Alaska pollack meat, 1 100 g of the proteinous material as obtained in Example 1 was added. Further 2 g of common salt was added thereto and thoroughly mixed. To the resulting mixture, the abovementioned curd-type product was added and mixed. Further 50 g of albumen and 100 g of water were added thereto and the obtained mixture was homogenized. After degassing, the mixture was introduced into a mold and aged at 85 to 90° C. for 30 minutes to thereby give a tofu-like food.

This tofu-like food was similar to a white kinugoshi-tofu ad showed a good taste when taken either in a cold or boiled state.

Example 52: Preparation of fried egg

To 100 g of whole eggs, 2 g of the proteinous material as obtained in Example 4, 1 g of common salt, 20 g of water and 3 g of starch were added and thoroughly stirred. The resulting mixture was treated in a conventional manner to thereby give a fried egg.

This fried egg has a characteristic flavor which was never observed in conventional ones and was highly tasty compared with that containing no proteinous material of the present invention.

Example 53: Preparation of Bavarian 10 g of a gelatin powder and 50 ml of water were introduced into a pot and the gelatin powder was allowed to swell for ten minutes. Then 60 of sugar and 30 g of yolk were added thereto and the mixture was stirred. 200 ml of milk and 50 g of the proteinous material as obtained in Example 4 were heated in another pot and then slowly added to the gelatin mixture while continuously stirring the mixture over a slow fire. When the yoke was cooked, the heating was stopped and an appropriate amount of vanilla essence was added thereto. The mixture was cooled until it became somewhat viscous. Separately 80 g of fresh cream and 10 g of sugar were gently beaten in a cold bowl on an ice-water bath at 5° C. When the fresh cream was gradually hardened, the viscous jelly as prepared above was added thereto and the mixture was quickly stirred. Fresh salad oil was applied onto a jelly mold to which the stirred Bavarian was poured. After solidifying by cooling, the Bavarian was taken out of the mold and placed on a dish.

The Bavarian thus obtained was smooth and had a mild and characteristic flavor. It was tasty compared with those containing no proteinous material of the present invention.

Example 54: Preparation of custard pudding 45 g of the proteinous material as obtained in Example 9, 100 g of water and 10 g of sugar were mixed together and heated to 60° C. Separately 30 g of whole eggs was mixed with 10 g of sugar in a bowl and the resulting mixture was slowly added to the heated mixture as described above under stirring. A small amount of vanilla essence was added thereto and the mixture was strained into a pudding mold containing a small amount of caramel sauce. Then it was placed on an iron plate, to which hot water was poured, and baked in an oven at 150° C.

The custard pudding thus obtained was not coarse but smooth and had a good taste.

Example 55: Preparation of cheese-like product 130 g of the proteinous material as obtained in Example 9 was introduced into an Agihomomixer (mfd. by Tokushukikako K.K.). Natural cheese (25 g of Cheddar cheese and 35 g of Gouda cheese) ground with a mincer, 0.5 g of sodium polyphosphate and 0.2 g of sodium pyrophosphate, which were employed for accerelating melting, 0.4 g of a fungicide and a small amount of cheese flavor were added thereto and the resulting mixture was kneaded. The mixture was stirred at 80° C. and 35 mm Hg and molten by heating to thereby give a product in the form of a paste. This product was poured into a mold and cooled to thereby give a product which had a smooth texture and a touch similar to that of a commercially available processed cheese.

Example 56: Preparation of hamburger steak

To 100 g of the proteinous material as obtained in Example 6, 100 g of ground fish meat, 2 g of common salt and 2 g of a flavoring were added. The resulting mixture was kneaded and formed into a plate of 1 cm in thickness. Then it was placed on a pan and steamed at a temperature of 85 to 90° C. Then it was slowly frozen in a refrigerator at −25° C.

The frozen plate material was cut into strips of 1 mm in width. Then these strips were further cut into flakes with a silent cutter (mfd. by Yasui Tekkosho K.K.) to thereby give scallop flakes.

Separately 1 g of common salt was added to 50 g of ground fish meat and the mixture was stirred. Then 50 g of the proteinous material as obtained in Example 6, 20 g of water, 20 g of onion pieces, 20 g of bread crumbs and 1 g of pepper were added thereto and thoroughly mixed.

30 g of the mixture thus obtained was blended with 25 g of the scallop flakes as prepared above and formed into a flat oval. Then this product was beaten with both hands several times to thereby harden the meat and adjust the shape. Subsequently it was fried in a frying pan. Thus a hamburger steak-like food having a good taste and a preferable eating texture was obtained.

Example 57: Preparation of nugget

To 100 g of the proteinous material as obtained in Example 1, 100 g of ground fish meat, 20 g of thermally gelling soybean protein, 10 g of albumen powder, 2 g of common salt and 2 g of a flavoring were added and the mixture was formed into a plate.

This material was steamed at 100° C. for 30 minutes, cooled and slowly frozen in a refrigerator at −25° C.

Then it was cut into fibers of 1 mm in width with a cutter (mfd. by Kawamoto Seisakusho K.K.) and then into flakes with a silent cutter (mfd. by Yasui Tekkosho K.K.) to thereby give salmon flakes.

Separately 100 g of ground fish meat was blended with 150 g of the proteinous material as obtained in Example 1, 1 g of common salt, 2 g of a flavoring, 20 g of an onion paste and 2 g of pepper and thoroughly mixed. To 20 g of the resulting mixture, 30 g of the salmon flakes as obtained above was added and formed into a nugget. Then it was coated with a powder and fried in oil at 180 to 190° C. to thereby give a nugget-like food having a good taste and an excellent eating texture.

Example 58: Preparation of nugget

To 100 g of the proteinous material as obtained in Example 3, 20 g of thermally gelling soybean protein, 5 g of albumen powder, and 10 g of thermally gelling whey protein were added and the mixture was formed into a plate. This material was steamed at 100° C. for 30 minutes, cooled and slowly frozen in a refrigerator at −25° C.

Then it was cut into fibers of 1 mm in width with a cutter (mfd. by Kawamoto Seisakusho K.K.) and then into flakes with a silent cutter (mfd. by Yasui Tekkosho K.K.) to thereby given short-necked clam flakes.

Separately 100 g of the proteinous material as obtained in Example 3, 100 g of ground fish meat, 5 g of albumen powder, 2 g of common salt, 2 g of a flavoring, 0.1 g of a short-necked clam flavor and 1 g of pepper were mixed together.

To 50 g of the resulting mixture, 50 g of the short-necked clam flakes as obtained above was added and formed into a nugget. Then it was coated with a powder and fried in oil at 180 to 190° C to thereby give a nugget-like food having a good taste and an excellent eating texture.

Example 59: Preparation of scallops-like food 100 g of the proteinous material as obtained in Example 6, 100 g of the proteinous material as obtained in Example 5, 50 g of thermally gelling soybean protein, 10 g of albumen powder, 50 g of thermally gelling whey protein, 2 g of common salt, 5 g of a flavoring and 0.2 g of a scallop flavor were mixed together and the resulting mixture was formed into a plate. This material was steamed at 100° C. for ten minutes, cooled and slowly frozen in a refrigerator at −25° C.

Then it was cut into fibers of 1 mm in width with a cutter (mfd. by Kawamoto Seisakusho K.K.) to thereby give a fibrous scallop-like product.

Separately, 100 g of the proteinous material as obtained in Example 6, 100 g of ground fish meat, 2 g of common salt, 1 g of a scallop flavor and 5 g of a flavoring were thoroughly mixed together.

The obtained mixture was placed on a cloth and spread into a plate of 2 mm in thickness. The fibrous scallop-like product was placed thereon and wrapped therewith. Thus a wrapped-in type food of 3 cm in diameter and 20 cm in length was obtained.

This product was steamed at 85 to 90° C., cooled and cut into pieces of 2 cm in length. Thus a scallops-like food having a good taste, an appropriate hardness and an excellent texture was obtained.

The following Examples will be given to illustrate the application of sardines rich in fats as the starting fish bodies.

Example 60

Sardine bodies, from which the internals, skins and fins had been removed, were heated to 95° C. with a steam for 30 minutes and then coarsely ground with a chopper (mfd. by Hanaki Seisakusho K.K.).

To the coarsely ground minced sardine meat thus obtained, twice as much as the sardine meat of water at 50° C. was added. The mixture was slowly poured into the inlet of a dacanter (mfd. by Tomoe Kogyo K.K.) at a flow rate of 2.0 t/hr to thereby separate most of the fats. The flakes thus obtained contained 56% by weight of moisture and not more than 3% by weight of the fats.

On the other hand, the separated mixture of fish oil and fish extract was continuously centrifuged to thereby further divide the same into fish oil, fish extract and a cake.

Said flakes and said cake were introduced into a mixing tank (mfd. by Satake Seisakusho K.K.). Then said fish extract was added thereto in such an amount as to give a moisture content of 80% by weight and the resulting mixture was stirred.

The mixture was fed into a mass colloider (mfd. by Masuko Seisakusho K.K.; a fine-grinding device) via a screw pump and finely ground therewith twice to thereby adjust the particle size, in particular, that of fish bones to 80 $\mu$ or less.

The finely ground fish meat containing bones was introduced into an enzymatic decomposition tank (mfd. by Stefan) and vitamin E was added thereto in such an amount as to give a concentration of 500 ppm based on the fat component in the aimed final product. The mixture was stirred at a low rate while elevating the temperature thereof to 50° C. by running warm water at 80° C. through the jacket. When this temperature reached 50° C., the temperature of the water running through the jacket was adjusted to 50° C. and 0.05% of a proteinase "Amano A" (mfd. by Amano Pharmaceutical Co., Ltd.) dissolved in a small amount of distilled water was added to the mixture. After the completion of the addition, the mixture was stirred at a high rate and maintained for 30 minutes. Then the temperature of the material was rapidly elevated to 75° C. by running warm water at 80° C. through the jacket to thereby inactivate the enzyme.

The obtained product was in the form of a paste containing 80% by weight of moisture and not more than 2% by weight of fats. Water-soluble proteins contained therein amounted to 32% by weight based on the total proteins contained therein. Peptides of 40,000 to 70,000 in molecular weight amounted to 85% by weight based on the total peptides except water-soluble ones and amino acids.

This product was pasteurized with an On-reiter (mfd. by Sakura Seisakusho K.K.) at 100° C. for ten minutes. The general bacterial count thereof was not more than 300 cells/g.

After the pasteurization, the producer was packed in 5-kg portions with a packing machine and frozen and stored in a refrigerator at −30° C.

Separately, the pasteurized product was dried with a drum dryer at 70° C. and powdered to thereby give a powdery product.

Example 61

Flakes containing 55% by weight of moisture and 2.5% by weight of fats, which was obtained by the same procedure as the one described in Example 60 by using a decanter, was introduced into an enzymatic decomposition tank similar to that of Example 60. Then it was stirred at a low rate while elevating the temperature thereof to 50° C. by running warm water at 80° C. thorough the jacket. When the temperature of the material reached 50° C., the temperature of the warm water running through the jacket was adjusted to 50° C. Then 0.05% by weight portions of proteinase "Amano A" and "Protin AC-10" (mfd. by Daiwa Kasei K.K.), each dissolved in a small amount of distilled water, were added to the mixture. Further vitamin E was added thereto in such an amount as to give a concentration of 500 ppm based on the fat component of ht aimed final product. After the completion of the addition, the mixture was stirred at a high rate and maintained for 30 minutes. Then the temperature of the material was rapidly elevated to 75° C. by running warm water at 80° C. through the jacket to thereby inactivate the enzymes.

This material was fed into a mass colloider via a screw pump and finely ground therewith twice to thereby adjust the particle size, in particular, that of the fish bones to 80 $\mu$ or less.

Water-soluble proteins contained in the obtained product amounted to 38% by weight based on the total proteins contained therein. Peptides of 40,000 to 70,000 in molecular weight amounted to 73% by weight based on the total peptides except water-soluble ones and amino acids.

This product was pasteurized with an On-reiter at 100° C. for ten minutes. The general bacterial count thereof was not more than 300 cells/g.

After the pasteurization, the product was packed with a packing machine in 5-kg portions and frozen and stored in a refrigerator at −30° C.

Separately the pasteurized product was spray-dried by blowing a hot air stream at 180°C. from a spray dryer thereto to thereby give a powdery product of a moisture content of 4% by weight.

Example 62

Flakes containing 60% by weight of moisture and 2% by weight of fat as, which were obtained by the same procedure as the one described in Example 60 by using a dacanter, were introduced into a mixing tank. Then water was added thereto in such an amount as to give a moisture content of 80% by weight. The resulting mixture was mixed. The mixture was then fed into a mass colloider via a screw pump and finely ground therewith twice to thereby adjust a particle size, in particular, that of the fish bones to 80 $\mu$ or less.

Separately, a lactic acid bacterium (*Streptococcus lactis*) was inoculated into a sterilized 10% by weight aqueous solution of skim milk and cultured at 37° C. for 24 hours to thereby give a starter.

The finely ground mixture of fish meat with fish bones was introduced into an enzymatic decomposition tank, similar to that of Example 60. Then it was stirred at a low rate, while running warm water through the jacket to thereby elevate the temperature of the material to 35° C. When the temperature reached 35° C., the temperature of the warm water running through the jacket was adjusted to 35° C. Then 0.03% by weight of a proteinase "Amano A" dissolved in a small amount of distilled water and 10% by weight of the above lactic acid bacterium starter were added to the mixture. After the completion of the addition, the mixture was stirred at a low rate for ten minutes and then allowed to stand for eight hours, thus simultaneously fermenting the same and treating the same with the enzyme.

This product was pasteurized with an On-reiter at 100° C. for ten minutes. The general bacterial count thereof was not more than 300 cells/g.

Water-soluble proteins contained in the product amounted to 32% by wight based on the total proteins contained therein. Peptides of 40,000 to 70,000 in molecular weight amounted to 60% by weight based on the total peptides except water-soluble ones and amino acids.

After the pasteurization, the product was packed in 5-kg portions with a packing machine and frozen and stored in a refrigerator at −30° C.

Example 63

Sardine bodies, from which the internals, skins and heads had been removed, were treated with a chopper (mfd. by Hanaki Seisakusho K.K.) twice to thereby give a minced meat.

To one part by weight of the coarsely ground sardine mince, two parts by weight of warm water at 45° C. was added. The resulting mixture was slowly poured into the inlet of a decanter (mfd. by Tomoe Kogyo K.K.) at a flow rate of 2.0 t/hr to thereby separate most of the fats. Thus flakes containing 55% by weight of moisture and not more than 3% by weight of the fats were obtained.

On the other hand, the separated mixture of fish oil with a fish extract was treated with a continuous centrifuge (mfd. by De Laval) to thereby divide the same into the fish oil, the fish extract and a cake.

The flakes and the cake were treated in the same manner as the one described in Example 60.

Example 64

Sardine bodies, from which the internals had been removed, were treated with a chopper (mfd. by Hanaki Seisakusho) twice to thereby give a minced meat.

To one part by weight of the coarsely ground sardine mince, three parts by weight of warm water at 37° C. was added. The resulting mixture was slowly poured into the inlet of a decanter (mfd. by Tomoe Kogyo K.K.) at a flow rate of 1.5 t/hr to thereby separate the fats. After repeating this procedure twice, flakes containing 53% by weight of moisture and not more than 2% by weight of the fats were obtained.

On the other hand, the separated mixture of fish oil with a fish extract was treated with a continuous centrifuge (mfd. by De Laval) to thereby divide the same into the fish oil, the fish extract and a cake.

The flakes and the cake were treated in the same manner as the one described in Example 61.

Example 65

Sardine bodies, from which the internals, skins and heads had been removed, were coarsely ground with a chopper (mfd. by Hanaki Seisakusho K.K.).

To the coarsely ground sardine mince, the same weight of warm water at 40° C. was added. The resulting mixture was slowly poured into the inlet of a decanter (mfd. by Tomoe Kogyo K.K.) at a flow rate of 1.5 t/hr to thereby separate most of the fats. After repeating this procedure twice, flakes containing 55% by weight of moisture and not more than 1% by weight of the fats were obtained.

These flakes were introduced into a double-wall mixing tank provided with a stirrer (mfd. by Satake Seisakusho K.K.) and water was added thereto in such an amount as to give a moisture content of 80% by weight. The resulting mixture was stirred.

Then the temperature of the bone-containing sardine meat was elevated to 50° C. by running warm water at 50° C. between the walls. 0.05% by weight of a proteinase "Amano A" (mfd. by Amano Pharmaceutical Co., Ltd.) dissolved in a small amount of distilled water was added thereto. Further vitamins E and C were added thereto in such amounts as to give concentrations of 500 ppm and 200 ppm, respectively, based on the fat component in the aimed final product.

The obtained mixture was fed into a mass colloider (mfd. by Masuko Seisakusho K.K.; a fine-grinding device) via a screw pump and finely ground therewith twice to thereby adjust the particle size, in particular, that of the fish bones, to 80 $\mu$ or less. During this period, the temperature of the material was maintained at 50 to 55° C. 30 minutes were taken from the addition of the enzymes to the component of this treatment.

The obtained product was in the form of a paste containing 80% by weight of moisture and not more than 1% by weight of fats. Water-soluble proteins contained in the product amounted to 30% by weight based on the total proteins contained therein. Peptides of 40,000 to 70,000 in molecular weight amounted to 70% by weight based on the total peptides except water-soluble ones and amino acids.

This product was immediately heated with an On-reiter (mfd. by Sakura Seisakusho K.K.) at 100° C. for ten minutes, thus simultaneously inactivating the enzyme and pasteurizing the product. The pasteurized product showed a general bacterial count not more than 300 cells/g.

After the pasteurization, the product was packed with a packing machine in 5-kg portions and frozen and stored in a refrigerator at −30° C.

Separately, the pasteurized product was dried with a drum dryer at 70° C. and finely ground to thereby give a powdery product.

Example 66

Sardine bodies, from which the internals and heads had been removed, were opened, thoroughly washed and coarsely ground with a chopper (mfd. by Hanaki Seisakusho K.K.),.

To the coarsely ground sardine mince, thrice as much warm water at 40° C. was added. The resulting mixture was slowly poured into the inlet of a decanter (mfd. by Tomoe Kogyo K.K.) at a flow rate of 1.7 t/hr to thereby separate most of the fats. After repeating this procedure twice, flakes containing 56% by weight of moisture and not more than 1% by weight of the fats were obtained.

These flakes were introduced into a double-wall mixing tank provided with a stirrer (mfd. by Satake Seisakusho K.K.). Then 5% by weight of a coculture medium of lactic acid bacteria (*Streptococcus lactis* and *Streptococcus cremoris*), which had been cultured in a skim milk medium, and 1% by weight of skim milk were added thereto. Simultaneously vitamins E and C were added thereto in such amounts as to give concentrations of 500 ppm and 200 ppm, respectively, based on the fat component of the aimed final product. Further water was added thereto in such an amount as to give a moisture content of the resulting mixture of 80% by weight.

Then the temperature of the bone-containing sardine meat was elevated to 40° C. by running warm water at 40° C. between the walls.

The obtained mixture was fed into a mass colloider via a screw pump and finely ground therewith twice to thereby adjust the particle size, in particular, that of the fish bones, to 80 $\mu$ or less.

Water-soluble proteins contained in the product amounted to 30% by weight based on the total proteins contained therein. Peptides of 40,000 to 70,000 in molecular weight amounted to 50% by weight based on the total peptides except water-soluble ones and amino acids. This product comprised 80% by weight of moisture and not more than 1% by weight of fats. It showed no sardine odor and smelled good.

This product was immediately heated with an Onreiter (mfd., by Sakura Seisakusho K.K.) at 100° C. for ten minutes, thus simultaneously inactivating the enzyme and pasteurizing the product. The pasteurized product showed a general bacterial count not more than 300 cells/g.

After the pasteurization, the product was packed with a packing machine in 5-kg portions and frozen and stored in a refrigerator at −30° C.

Separately, the pasteurized product was dried with a drum dryer at 70° C. and finely ground to thereby give a powdery product.

Example 67

Sardine bodies, from which the internals, skins and heads had been removed, were thoroughly washed and then coarsely ground with a chopper.

To one part by weight of the coarsely ground sardine minced meat containing the bones, three parts by weight of water at ambient temperature was added. The resulting mixture was slowly poured into the inlet of a decanter (mfd. by tomoe Kogyo K.K.) at a flow rate of 1.5 t/hr to thereby separate most of the fats. Afer repeating this procedure twice, flakes containing 54% by weight of moisture and not more than 1% by wight of the fats were obtained.

These flakes were introduced into a double-wall mixing tank provided with a stirrer (mfd. by Satake Seisakusho K.K.) and vitamins E and c were added thereto in such amounts as to give concentrations of 500 ppm and 200 ppm, respectively, based on the fat component of the aimed final product. Then the temperature of the mixture was elevated to 40° C. by running warm water at 40° C. between the walls. 5% by weight of a lactic acid bacterium (*Streptococcus cremoris*), which had been preliminarily cultured in a skim milk medium, was immediately added thereto together with 0.03% by weight of a proteinase "Amano A" (mfd. by Amano Pharmaceutical Co., Ltd.) dissolved in a small amount of water. The resulting mixture was stirred well and warm water at 40° C. was added thereto to thereby adjust the moisture content of the mixture to 80% by weight.

After mixing, the obtained mixture was fed into a mass colloider via a screw pump and finely ground therewith twice to thereby adjust the particle size, in particular, that of the fish bones, to 80 $\mu$ or less.

The obtained product was in the forms of a paste which had no sardine odor but smelled good and contained 80% by weight of moisture and not more than 1% by weight of the fats. Water-soluble proteins contained in the product amounted to 32% by weight based on the total proteins contained therein. Peptides of 40,000 to 70,000 in molecular weight amounted to 65% by weight based on the total peptides except water-soluble ones and amino acids.

This product was immediately heated with an Onreiter at 100° C. for ten minutes, thus simultaneously inactivating the enzyme and pasteurizing the product. The pasteurized product showed a general bacterial count not more than 300 cells/g.

After the pasteurization, the product was packed with a packing machine in 5-kg portions and frozen and stored in a refrigerator at −30° C.

Separately, the pasteurized product was dried with a drum dryer at 70° C. and finely ground to thereby give a powdery product.

Example 68: Preparation of sardine slice product 600 g of the proteinous material in the form of a pale green paste as obtained in Example 60, 50 g of soybean protein powder, 20 g of powdery gelatin, 100 g of sodium caseinate, 250 g of refined soybean oil, 20 g of sodium tartrate, 6 g of gum xanthan, 10 g of common salt, 1 g of sodium glutamate, 1 g of pepper and 3.0 g of a flavoring were introduced into an emulsifying pot (mfd. by Ohe Seisakusho K.K.) and stirred therein at a low rate while evacuating and directly injecting a steam into the jacket and into the pot. When the internal temperature reached 50° C., the mixture was stirred at a high rate and the injection of the steam into the pot was ceased. Then the stirring at a high rate was continued until the internal temperature reached 80° C. When the internal temperature reached 80° C., the injection of the steam into the jacket and the evacuation were ceased. Then the lid of the emulsifying pot was removed and the molten contents were transferred to a stainless bucket.

The product was placed in the form of a bar on a wrapping film while it was hot nd covered with the wrapping film. Then it was spread to form a plate of 2 mm in thickness and then the wrapping film was cut into squares and folded. The material was cooled in a refrigerator to thereby give a sardine slice product in the form similar to a sliced cheese.

When used in, for example, sandwitch, this sardine slice product of carton type showed a sardine taste and a smooth and nice eating texture.

Example 69: Preparation of sardine bar product 500 g of the proteinous material in the form of a pale green paste as obtained in Example 61, 100 g of ground codfish meat, 20 g of soybean protein, 10 g of whey protein, 10 g of albumen powder and 2 g of common salt were thoroughly kneaded together in a Robot Coupe (mfd. by Robot Coupe). Then the kneaded material was extruded from a nozzle having a gauzy tip into boiling water and solidified to thereby give a fibrous composition. On the other hand, 500 g of the proteinous material in the form of a pale green paste as obtained in Example 62, 200 g of ground codfish meat, 2 g of common salt and 2 g of a flavoring were kneaded with a Robot Coupe (mfd. by Robot Coupe) at a temperature of the material not higher than 10° C. The obtained mixture was spread onto a moist cloth in a thickness of approximately 3 mm. The fibrous composition as prepared above was placed thereon and wrapped therewith. Thus a product in the form of a bar containing the fibrous composition as the core was obtained. Then the product on the cloth was steamed as such at the boiling temperature for approximately 30minutes. After the completion of the steaming, a sardine bar product having an excellent sardine taste and containing 45 to 70% of sardine was obtained. This product was not coarse but smooth.

Example 70: Preparation of drink 100 g of the proteinous material as obtained in Example 62 was introduced into a beaker and 300 g of water, 15 g of sucrose and 1 g of gum xanthan were added thereto. The resulting mixture was mixed with a homomixer and pasteurized at 145° C. for three seconds. Then it was cooled to 10° C. and an appropriate amount of milk flavor was added thereto to thereby give a drink. This drink had an appearance similar to that of milk and a milky taste.

Example 71: Preparation of drink 100 g of the proteinous material as obtained in Example 62 was introduced into a beaker and 300 g of water, 15 g of sucrose and 2 g of gum xanthan were added thereto. The resulting mixture was a mixed with a homomixer and 200 g of milk was further added thereto to thereby give a drink. This drink had an excellent taste similar to that of milk.

Example 72: Preparation of drink 100 g of the proteinous material as obtained in Example 60 was introduced into a beaker and 360 g of water, 40 g of a fructose/glucose solution, 0.5 g of gum xanthan and 3 g of CMC were added thereto. After homogenizing the resulting mixture, 200 g of a vegetable juice was further added thereto to thereby give a drink. This drink had a good taste.

Example 73: Preparation of cake

To 175 g of soft wheat flour, a small spoonful of cinnamon, a small spoonful of sodium bicarbonate, a ¼ small spoonful of salt and two small spoonfuls of baking powder were added and mixed. Separately, 150 cc of salad oil and 140 g of sugar were thoroughly beaten in a bowl with a beater. Then two eggs and 140 g of the proteinous material as obtained in Example 63 were added thereto and the resulting mixture was thoroughly mixed. The former mixture was combined with the latter one and mixed to thereby give a cake dough. This dough was poured into an oil-coated and powdered mold and baked in an oven an 160° C. for 40 to 60 minutes to thereby give a cake.

This cake had an excellent appearance, a nice smell and a good taste.

Example 74: Preparation of crepe

To 350 cc of milk, a large spoonful of sugar and 30 g of butter were added and the resulting mixture was heated to 50 to 60° C. Separately, two eggs, 100 g of soft wheat flour and 50 g of the proteinous material as obtained in Example 60 were thoroughly mixed together. To the resulting mixture, the former one was added by portions and mixed. Then the obtained mixture was strained and allowed to stand for 30 to 60 minutes with covering with a strongly squeezed moist cloth. Then it was fried in a frying pan to thereby give a crepe.

This crepe had an excellent appearance, a characteristic flavor, a nice smell and a good taste.

Example 75: Preparation of Chinese karinto (fried dough cake)

To 50 g of the proteinous material as obtained in Example 64, two large spoonfuls of sugar, a small spoonful of salad oil and 50 cc of warm water were added and the mixture was thoroughly mixed. Then 100 g of soft wheat flour was added thereto and the resulting mixture was thoroughly kneaded and allowed to stand for approximately 30 minutes with covering with a strongly squeezed moist cloth to thereby give a dough. This dough was spread with a roll pin in a thickness of 5 mm and cut into strips of 8 mm in width and 15 cm in length. Two strips were twisted together and fried in oil at 170° C for four to five minutes to thereby give a Chinese karinto.

This Chinese karinto had an excellent appearance, a nice smell and a good taste.

Example 76: Preparation of cheese stick 250 g of sieved hard wheat flour was introduced into a bowl. 25 g of grated cheese (processed cheese) was added thereto and the resulting mixture was thoroughly kneaded. Then a cavity was formed at the center of the kneaded mixture and 13 g of live yeast dissolved in 50 cc of warm water, a solution of a large spoonful of sugar and a small spoonful of salt in 50 cc of warm water and 50 g of the proteinous material as obtained in Example 60 were introduced therein. The obtained mixture was kneaded and 25 g of butter and 25 g of shortening were finally added thereto. Then the mixture was fermented at 30° C. for 40 to 60 minutes, degassed and spread to form a rectangle (10 cm × 25 cm). Then it was equally divided into 10 to 12 portions with a skepper, allowed to stand for 15 minutes and formed into thin sticks. Each stick was folded in two and twisted. These sticks were placed on an oven plate, fermented at 36 to 38° C for 40 minutes and then baked in an oven at 190° C for 15 to 20 minutes to thereby give cheese sticks.

These cheese sticks had an excellent appearance, a highly preferable flavor and a good taste.

Example 77: Preparation of pie 100 g of butter was rounded into thumb-sized pieces and gently mixed with 100 g of wheat flour. 1.5 g of common salt and 30 g of the proteinous material as obtained in Example 62 were dispersed in cold water and the resulting dispersion was poured onto the above mixture by portions to thereby form a dough. Then the dough was covered with a strongly squeezed moist cloth and allowed to stand for five minutes. Subsequently the dough was spread into a rectangle with a roll pin while using a coating powder and then folded in three. After repeating this procedure twice, the dough was covered with a strongly squeezed moist cloth and allowed to stand for a while. Then the dough was cut into pieces (5 cm×5 cm) and baked at 200° C. to thereby give a pie.

This pie had an excellent appearance, a characteristic flavor and a good taste.

Example 78: Preparation of spread

To 120 g of the proteinous material as obtained in Example 60, 2 g of sodium caseinate, 8 g of common salt, 10 g of mustard, 20 g of grated onion and a small amount of pepper were added and the resulting mixture was thoroughly stirred. Then 100 ml of safflower oil was added thereto under stirring and the resulting mixture was roughly emulsified. Subsequently the mixture was stirred with a homomixer (mfd. by Nippon Kakoki K.K.) to thereby give an emulsified composition in the form of a spread.

When applied on bread, this product was highly spreadable and tasty.

Example 79: Preparation of emulsified fat for both topping and kneading with wheat flour To 100 g of the proteinous material as obtained in Example 61, 60 g of salad oil was slowly added under stirring. The resulting mixture was emulsified with a homomixer to thereby give an emulsified fat composition.

This emulsified fat composition was applied to the surface of a cookie or a bun prior to the baking. After the baking the cookie or bun showed an excellent gloss, a good color of baking and a nice taste.

Separately 10 g of the emulsified fat composition as obtained above and 1 g of common salt dissolved in 40 cc of hot water were added to 100 g of wheat flour. The resulting mixture was thoroughly kneaded and wrapped with a moist cloth. After allowing to stand for 30 minutes, a gyoza coating was prepared therefrom. Then gyozas were prepared by using the same. The gyozas thus obtained had an excellent color of baking and a good taste.

Example 80: Preparation of arare 500 g of nonglutinous rice was washed with water, immersed in water over day and night and other steamed. 50 g of the proteinous material as obtained in Example 63 was added thereto and the mixture was kneaded with a mixer to thereby give a dough. Then this dough was spread in a thickness of 4 cm in a mold and dried. It was cut into squares, dried again and roasted to thereby give arares.

These arares had an excellent appearance, a nice flavor and a good taste.

Example 81: Preparation of upon noodles

To 100 ml of water, a small spoonful (5 g) of common salt and 60 g of the proteinous material as obtained in Example 60 were added and the mixture was thoroughly mixed. The mixture was added by portions onto 300 g of sieved semihard wheat flour and strongly kneaded. Then the obtained mixture was rounded, covered with a moist cloth and allowed to stand for approximately two hours. Subsequently it was spread by using a coating powder and cut into strips to thereby give a hand-made upon-like product. These udon noodles were boiled in a sufficient amount of water and washed with water to thereby give udon noodles of a smooth texture.

The dried noodles obtained by drying these udon noodles similarly showed a good taste when boiled.

Example 82: Preparation of gnocchis 210 ml of milk and 50 g of butter were introduced into a pot and heated. When the mixture came to boil, 150 g of well-sieved soft wheat flour was added thereto at once. The mixture was quickly stirred with a wood pastula. When a glossy lump was formed, the heating was ceased and 80 g of the proteinous material as obtained in Example 61 and three eggs (150 g) were added thereto. 1 g of nutmeg, 20 g of grated cheese and a small amount of common salt were further added thereto and the mixture was kneaded. The obtained dough was introduced into a squeezing bag provided with a round cap (1 cm).

The dough was squeezed from the bag into boiling water containing a small amount of common salt to give a length of 3 cm and boiled therein for eight minutes. When the squeezed products came to the surface, they were taken and strained. Then they were fried with butter in a frying pan and seasoned with salt, pepper and cheese powder. Thus tasty gnocchis were obtained.

Separately, the squeezed dough was fried in oil and seasoned with salt, pepper and cheese powder. This product was also tasty.

Example 83: Preparation of batter for fried food (1) After removing the calyces, three eggplants were cut lengthwise and further cut into sticks of 1 cm in length. These sticks were leached with water.

(2) Seeds were removed from 300 g of a pumpkin with a spoon. Then the pumpkin was nonuniformly peeled and cut into sticks of 1 cm square similar to the eggplants.

(3) 100 g of kidney beans were stringed and cut into two, if too long.

(4) After wiping off the moisture, the materials of (1) to (3) were slightly seasoned with salt and pepper.

(5) An egg, salt, olive oil and water were mixed in a bowl. 175 g of wheat flour was sieved therein and 25 g of the proteinous material as obtained in Example 60 was further added thereto. After gentle mixing, a batter was obtained.

(6) A frying oil was heated to a moderate temperature and each material of (4) coated with the batter of (5) was fried therein until the core material was cooked and the fried food was crispy.

Thus Italian ate fried vegetables which were superior in the taste, flavor and texture to conventional ones were obtained.

Example 84: Preparation of sauce veloute 30 g of butter was molten in a pot and 35 g of soft wheat flour was added thereto and quickly stirred. The flour was thus fried until it was slightly colored. Then 80 g of the proteinous material as obtained in Example 61 dissolved in 500 cc of water was slowly added thereto and the obtained mixture was homogenized by quickly stirring. 2 g of salt, an appropriate amount of pepper and a laurel leaf were added thereto and the resulting mixture was cooked on a slow fire for 30 to 35 minutes under stirring.

Thus a tasty sauce veloute having a characteristic flavor was obtained.

Example 85: Preparation of sauce tartar

To 75 g of mayonnaise, 75 g of the proteinous material as obtained in Example 60 was added. Further a half of a completely boiled egg, 10 g of onion, 10 g of pickled cucumber and 2.5 g of parsely, each cut into small pieces, and a small amount of mustard paste were added thereto. The mixture thus obtained was homogenized.

Thus a tasty sauce tartar having a characteristic flavor was obtained.

Various tasty sauces each having a characteristic flavor may be prepared by using mayonnaise and the proteinous material as obtained in Example 60 in a similar manner to the one as described above.

Example 86: Preparation of gravy for roasted meat

To 100 ml of soy sauce, 20 g of the proteinous material as obtained in Example 62, 35 ml of mirin, 23 g of sugar, 2 g of sodium glutamate, 4 g of a composite flavoring, 0.3 g of pepper, 3.5 g of onion paste, 15 g of garlic puree and 30 cc of warm water were added and the obtained mixture was homogenized. Then 4 g of soybean oil was added thereto and the mixture was mixed with a homomixer.

Thus a gravy which had an excellent flavor and was highly suitable for, e.g., roasted meat was obtained.

Example 87: Preparation of cooking food material 80 parts by weight of the proteinous material as obtained in Example 61 was blended with 20 parts by weight of wheat flour and a small amount of a flavoring. The resulting mixture was homogenized by kneading to thereby give a dough. This dough was allowed to stand for a while and then treated in the following manners.

(a) Dumplings were formed from the dough and introduced into boiling water.

(b) Dumplings were formed, spread flat and baked.

(c) Dumplings were formed, spread flat, coated with bread crumbs and fried in oil.

(d) Dumplings were formed and spread flat and vegetable fillings were wrapped therewith. The obtained material was steamed.

(e) The dough was formed into a croquette-like shape and fried in oil at a moderate temperature until it was scorched.

Each cooked food thus obtained had a characteristic flavor and texture and a good taste, compared with conventional ones.

Example 88: Preparation of mousse 200 g of frozen and ground Alaska pollack meat (SA) and 100 g of water were ground together with a silent cutter while adding 6 g of common salt thereto. Five minutes thereafter, 400 g of the proteinous material as obtained in Example 63, 50 g of albumen, 200 cc of fresh cream and 120 g of boiled and drained spinach were added thereto and the obtained mixture was homogenized by kneading. The mixture was introduced into a mold and steamed as such in an oven at 200° C for 20 minutes to thereby give 930 g of a mousse.

The obtained mousse was taken by way of trial by ten panelists together with sauce Americane. As a result, the appearance, texture and taste of the product were highly evaluated.

Example 89: Preparation of cream soup 30 g of butter was molten in a pot and 50 g of onion pieces were fried therewith. 40 g of wheat flour was added thereto and the frying was continued for additional two to three minutes. Then 150 g of the proteinous material as obtained in Example 61 dissolved in 1000 cc of water was added thereto. When the obtained mixture came to boil, the mixture was cooked on a slow fire for 30 to 40 minutes. The material thus obtained, which was to be used as a base, was diluted with 200 cc of water and seasoned with a small amount of salt, a small amount of pepper and 100 cc of fresh cream.

Thus a tasty cream soup having a characteristic flavor was obtained.

Example 90: Preparation of egg soup 400 cc of a soup stock was introduced into a pot, cooked over a fire and seasoned with 6 cc of soy sauce and a small amount of salt. When 3 g of potato starch dissolved in 10 cc of water became somewhat viscous, 20 g of the proteinous material as obtained in Example 60 and 50 g of a fresh egg were thoroughly mixed together and added to the above soup through a holed spatula. When the mixture came to boil, the heating was immediately ceased.

Thus an egg soup having an excellent flavor wherein the taste of the proteinous material of the present invention matched well the taste of the egg was obtained.

Example 91: Preparation of gruel 150 cc of water or a soup stock was introduced into a pot and boiled. Then 50 g of cooked rice was quickly washed with hot water and added thereto. Then the mixture was cooked and a small amount of common salt and 30 g of the proteinous material as obtained in Example 63 were added thereto during the cooking. The heating was continued until the gruel contained no soup. The gruel may be seasoned with soy sauce or miso, if desired.

Thus a highly tasty gruel having the taste and viscosity of the proteinous material of the present invention was obtained.

Example 92: Preparation of hamburger steak 12 g of loaf bread was finely divided and mixed with 15 g of the proteinous material as obtained in Example 60. To the obtained mixture, 70 g of minced beef, 30 g of fried onion pieces, 12 g of egg, 1.2 g of salt, a small amount of pepper and a small amount of a synthetic flavoring were added. After thoroughly mixing, the obtained material was formed into an oval and beaten with the right hand onto the left hand several times to thereby harden the meat. After adjusting the shape, the material was fried in a frying pan.

The hamburger steak thus obtained had an excellent appearance and a good taste.

Example 93: Preparation of hamburger steak

To 100 g of the proteinous material as obtained in Example 60, 100 g of ground fish meat, 2 g of common salt and 2 g of a flavoring were added. The resulting mixture was kneaded and formed into a plate of 1 cm in thickness. Then it was placed on a pan and steamed at a temperature of the material of 85 to 90° C. Then it was slowly frozen in a refrigerator at −25° C. The frozen plate was treated with a block cutter (mfd. by Hanaki Seisakusho K.K.) and then with a silent cutter (mfd. by Yasui Tekkosho K.K.) to thereby give sardine flakes.

Separately, 50 g of ground fish meat, 1 g of common salt, 50 g of the proteinous material as obtained in Example 60, 20 g of water, 50 g of onion pieces, 20 g of bread crumbs and 1 g of pepper were thoroughly blended together.

To the mixture thus obtained, 25 g of the sardine flakes were added and the resulting mixture was formed into an oval. The oval material was beaten with both hands several times to thereby harden the meat, adjusted the shape and fried in a frying pan. The hamburger steak-like food thus obtained had an excellent flavor and an appropriate hardness.

Example 94: Preparation of kamaboko-like food 80 parts of frozen ground fish meat was agitated and milled at a temperature of the material of approximately −5 to −6° C. and two parts of common salt was added thereto at approximately 1° C. 20 parts of the proteinous material as obtained in Example 62, ten parts of starch, two parts of a flavoring, ten parts of frozen albumen, five parts of sugar, five parts of mirin and five parts of water were added thereto while continuing the stirring.

An appropriate amount of the mixture thus obtained was placed on a kamaboko-plate, introduced into a retainer, allowed to stand at 40° C. for 40 minutes to thereby effect gelation, steamed at 98° C. for 40 to 70 minutes and then cooled.

Thus a tasty kamaboko having a soft texture different from those of conventional ones was obtained.

Example 95: Preparation of tofu 100 g of the proteinous material as obtained in Example 60 was added to 500 ml of water and thoroughly mixed. 65 g of a soybean milk powder was added to the above mixture by portions. The obtained mixture was heated under stirring while avoiding scorching. After maintaining the temperature of the mixture at 80 to 95° C. for several minutes, the heating was stopped. Then a solidifier (a gluconolactone preparation) was added thereto and stirred. The resulting material was quickly poured into an appropriate container and formed. When the formed material was sufficiently solidified, it was taken out of the container and leached with water. Thus a tofu was obtained.

This tofu was tasty.

Example 96: Preparation of Western style chawanmushi

To 100 g of eggs, 200 g of fresh cream, 50 ml of white wine, 10 g of sugar and a small amount of garlic were added. The resulting mixture was stirred without foaming. Then 50 g of canned crab flakes and 50 g of the proteinous material as obtained in Example 61 were added thereto. The obtained material was introduced into five coffee cups and steamed at 100° C. for 15 minutes. Separately 1 g of sodium caseinate, 40 g of salad oil and 100 g of the proteinous material as obtained in Example 61 were introduced into a bowl and stirred at a high rate to thereby give a spread. This spread was uniformly placed on the steamed mixture in the cups, together with a lemon slice and parsely.

The Western style chawanmushi thus obtained had a smooth dough and a good taste. Further the spread was also smooth. This product had a characteristic and good flavor compared with conventional ones containing no proteinous material of the present invention.

Example 97: Preparation of wine jelly 40 g of gelatin was allowed to swell in water and then drained. 1000 ml of water, the above gelatin, 210 g of sugar and three lemon slices were introduced into a pot. Then the mixture was heated over a moderate fire for 30 minutes under continuously stirring with a wood spatula. When the mixture came to boil, it was cooked over a slow fire and gently boiled. To the sugar jelly thus obtained, 100 g of the proteinous material as obtained in Example 62, 60 ml of red wine and 20 ml of lemon juice were added and thoroughly mixed. Then the mixture was heated for ten minutes in such a manner as not to come to boil. The obtained material was poured into ten jelly molds and cooled. When solidified, it was transferred onto a dish and decorated with beaten cream.

The jelly thus obtained was not coarse but smooth and tasty.

Example 98: Preparation of yogurt 100 g of the proteinous material as obtained in Example 62, 100 g of water and 10 g of skim milk was combined together and stirred with homomixer to thereby give a homogeneous and somewhat viscous solution. This solution was heated to 50° C and 16 g of sugar was added thereto. Then it was pasteurized at 100° C. for 30 minutes and cooled to 37° C. 5 g of a culture medium obtained by culturing *Streptococcus thermophilus, Streptococcus lactis* and *Lactobacillus bulgaricus* in a 10% skim milk solution was added to the mixture. The obtained material was introduced into a sterilized yogurt bottle and covered with a paper lid. Then it was fermented at 37° C. for seven hours and then allowed to stand at 5° C. for 12 hours. Thus a yogurt of a smooth texture having an acidity of 0.8% was obtained.

Example 99: Preparation of cheese spread 200 g of the proteinous material as obtained in Example 61 was introduced into an Agihomomixer (mfd. by Tokushuki Kako K.K.). Then natural cheese ground with a mincer (comprising 25 g of Cheddar cheese and 25 g of Gouda cheese), 0.3 g of sodium polyphosphate and 0.2 g of sodium pyrophosphate, which were employed for accerelating melting, 0.4 g of a fungicide and a small amount of a cheese flavor were added thereto. After kneading, the resulting mixture was stirred at a high rate and molten by heating to thereby give a mixture in the form of a paste. This paste was poured into a mold and cooled. Thus a product having a smooth texture similar to those of commercially available ones was obtained.

Example 100: Preparation of nugget

To 100 g of the proteinous material as obtained in Example 61, 20 g of thermally gelling soybean protein, 10 g of albumen powder, 20 g of thermally gelling whey protein, 1 g of common salt and 2 g of a flavoring were added. The resulting mixture was formed into a plate and slowly frozen in a refrigerator at −25° C.

Then it was cut into fibers of 1 mm in width with a cutter (mfd. by Kawamoto Seisakusho K.K.) and then into pieces with a silent cutter (mfd. by Yasui Tekkosho K.K.) to thereby give sardine flakes. On the other hand, 100 g of the proteinous material as obtained in Example 61, 1 g of common salt, 2 g of a flavoring, 20 g of albumen powder and 10 g of whey protein were thoroughly mixed together.

To 100 g of the obtained mixture, 100 g of the sardine flakes were added and the mixture was formed into nuggets. These nuggets were coated with a powder and fried in oil at 180 to 190° C. Thus a nugget-like food having an excellent taste and eating texture was obtained.

Industrial Applicability

The process for producing a proteinous material of the present invention can exert the following effects.

(1) A highly nutritious proteinous material can be produced from fish bodies containing bones, from which the internals have been removed optionally together with the heads and skins.

(2) A proteinous material having a small capability of gelation and rich in nutrients such as calcium and iron can be obtained from fishes and shellfishes. The proteinous material may be utilized in various foods unlike conventional fish meal which is available only in feeds.

(3) An undeteriorated fish oil can be obtained from fishes rich in fats. Further a proteinous material, which is highly available in various foods unlike conventional fish meal which is available only in feeds, can be obtained.

What is claimed is:

1. A process for producing a proteinous material which comprises coarsely grinding fish bodies including bones and/or shells, from which the internals had been removed optionally together with heads and/or skins, and either (1) fermenting said coarsely ground fish bodies with an enzyme and/or a microorganism, inactivating said enzyme and/or microorganism and then finely grinding the fermented material to give a particle size of bones and/or shells of $100\mu$ or less; or (2) finely grinding said coarsely ground fish bodies to give a particle size of bones and/or shells of $100\mu$ or less, fermenting the same with an enzyme and/or a microorganism, and then inactivating said enzyme and/or microorganism; or (3) finely grinding said coarsely ground fish bodies to give a particle size of bones and/or shells of $100\ \mu$ or less while fermenting the same with an enzyme and/or a microorganism and then inactivating said enzyme and/or microorganism.

2. A process for producing a proteinous material as set forth in claim 1, wherein said fish bodies contain not more than 20% by weight of fats.

3. A process for producing a proteinous material which comprises coarsely grinding fish bodies including bones and/or shells, from which the internals had been removed optionally together with heads and/or skins, removing fat as from the coarsely ground fish bodies, and either (1) fermenting said coarsely ground fish bodies with an enzyme and/or a microorganism, inactivating said enzyme and/or microorganism and then finely grinding the fermented material to give a particle size of bones and/or shells of $100\mu$ or less; or (2) finely grinding said coarsely ground fish bodies to give a particle size of bones and/or shells of $100\mu$ or less, fermenting the same with an enzyme and/or a microorganism and then inactivating said enzyme and/or microorganism; or (3) finely grinding said coarsely ground fish bodies to give a particle size of bones and/or shells of $100\mu$ or less while fermenting the same with an enzyme and/or a microorganism and then inactivity said enzyme and/or microorganism.

4. A process for producing a proteinous material as set forth in claim 3, wherein the removal of the fats is carried out until the fat content of the coarsely ground and defatted fish bodies is reduced to 20% by weight or less.

5. A process for producing a proteinous material as set forth in claim 3, wherein said fish are sardines.

6. A process for producing a proteinous material as set forth in claim 4, wherein the removal of the fats is carried out until the fat content of the coarsely ground and defatted fish bodies is reduced to 5% by weight or less.

* * * * *